US007956295B2

(12) United States Patent
Arbel

(10) Patent No.: US 7,956,295 B2
(45) Date of Patent: Jun. 7, 2011

(54) METHOD AND APPARATUS FOR FINISHED INSTALLATION OF ELECTRICAL OUTLET BOX WITHOUT USE OF EXTERNAL COVER PLATE

(75) Inventor: Omer Arbel, Vancouver (CA)

(73) Assignee: Bocci Design & Manufacturing Inc., Vancouver, British Columbia (CA)

( * ) Notice: Subject to any disclaimer, the term of this patent is extended or adjusted under 35 U.S.C. 154(b) by 634 days.

(21) Appl. No.: 11/731,107

(22) Filed: Mar. 30, 2007

(65) Prior Publication Data

US 2008/0236884 A1 Oct. 2, 2008

(51) Int. Cl.
*H02B 1/40* (2006.01)
*H05K 5/03* (2006.01)

(52) U.S. Cl. ............ 174/480; 174/481; 174/66; 174/67; 220/3.2; 220/3.3; 220/241; 33/DIG. 10

(58) Field of Classification Search .................. 174/480, 174/481, 50, 53, 57, 58, 66, 67, 520; 220/3.2–3.9, 220/4.02, 241, 242; 52/220.8, 220.1; 33/DIG. 10, 33/528
See application file for complete search history.

(56) References Cited

U.S. PATENT DOCUMENTS

| | | | | |
|---|---|---|---|---|
| 1,066,706 | A | | 7/1913 | Caine |
| 3,636,236 | A | * | 1/1972 | Smith ............................. 174/66 |
| 3,651,245 | A | * | 3/1972 | Moll ............................... 174/66 |
| 4,247,738 | A | | 1/1981 | Bonato |
| 4,353,759 | A | * | 10/1982 | Stallings ......................... 174/66 |
| 4,399,922 | A | | 8/1983 | Horsley |
| 4,569,458 | A | | 2/1986 | Horsley |
| 4,757,158 | A | * | 7/1988 | Lentz ............................. 174/53 |
| 5,287,665 | A | * | 2/1994 | Rath, Jr. ......................... 220/3.3 |
| 5,321,206 | A | * | 6/1994 | Hibler ............................ 174/66 |
| 5,740,936 | A | | 4/1998 | Nash |
| 5,965,846 | A | * | 10/1999 | Shotey et al. ................... 174/66 |
| 6,037,542 | A | * | 3/2000 | McCall ........................... 174/66 |
| 6,239,365 | B1 | * | 5/2001 | McEvers ........................ 174/58 |
| 6,395,984 | B1 | * | 5/2002 | Gilleran ......................... 174/58 |
| 6,649,835 | B2 | * | 11/2003 | Gilleran ......................... 174/58 |
| 7,259,329 | B1 | * | 8/2007 | Balma et al. ................... 174/66 |
| 7,389,616 | B2 | * | 6/2008 | Gilleran ....................... 52/220.8 |
| 7,687,712 | B2 | * | 3/2010 | Price .............................. 174/66 |

FOREIGN PATENT DOCUMENTS

| | | |
|---|---|---|
| CA | 2017589 | 1/1995 |
| EP | 1739254 A2 | 1/2007 |

* cited by examiner

*Primary Examiner* — Angel R Estrada
(74) *Attorney, Agent, or Firm* — Todd N. Hathaway

(57) ABSTRACT

An electrical outlet box installation in which there is no exposed cover plate, only the operative portion of the electrical component is visible at the wall surface. The operative portion of the component may be an electrical outlet, jack, switch, knob, or light, for example. The body of the electrical component is housed within the outlet box, also referred to as a junction box, with the open side of the outlet box being covered by a plate assembly having an opening that closely surrounds the operative portion of the component. The surface of the plate assembly is covered with wallboard mud, or other wall finishing material, which is blended into the surrounding surface of the wall so that only the operative portion of the component is exposed. The plate assembly includes a projecting wall or lip around the opening, up to which the mud or other fill material is applied. The wall covering may also be panelling, stone, tile or similar materials, in which instances the operative portion of the component may protrude somewhat from the plate assembly so as to be positioned at the surface of the overlay material. Configurations are provided for use with conventionally shaped outlet boxes and components, and additional configurations are provided which employ specially shaped components which are removably installed in cooperating receptacles formed in the plate assemblies.

19 Claims, 26 Drawing Sheets

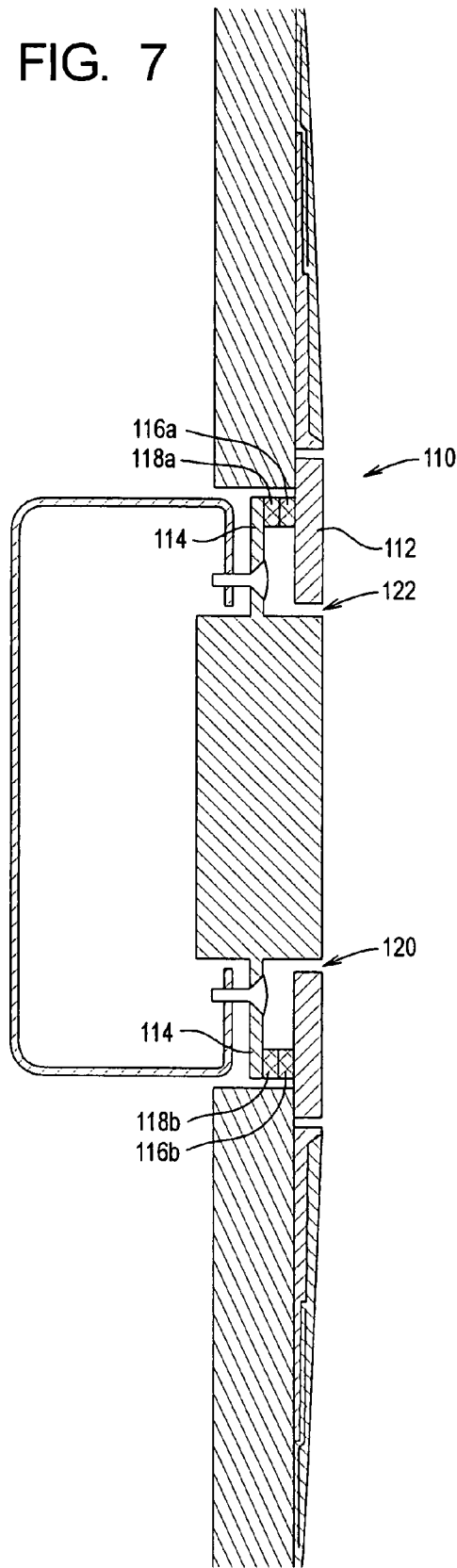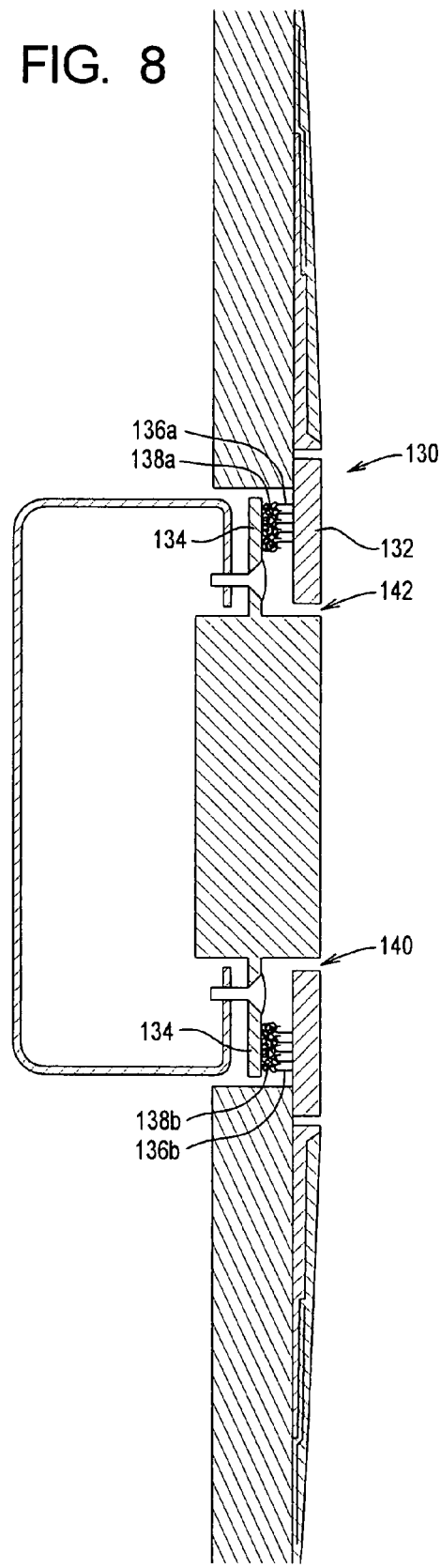

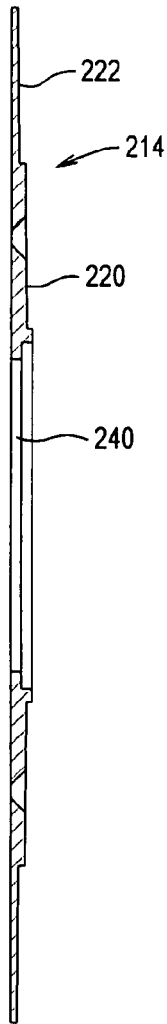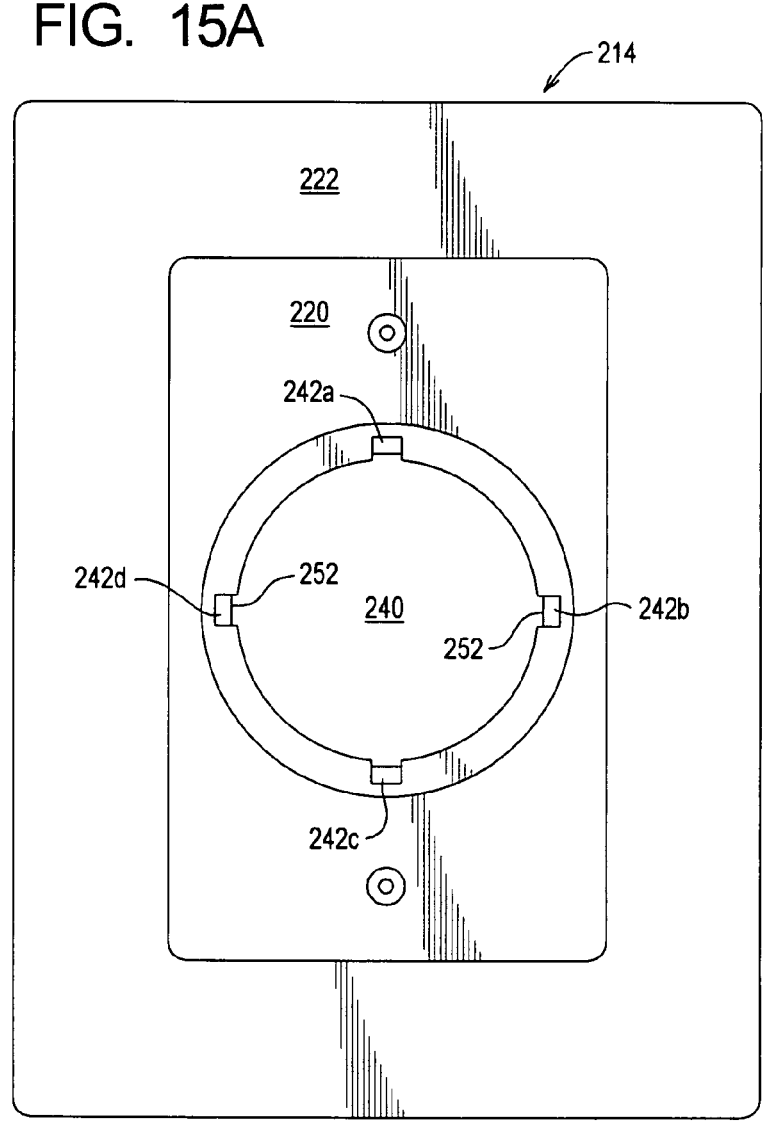

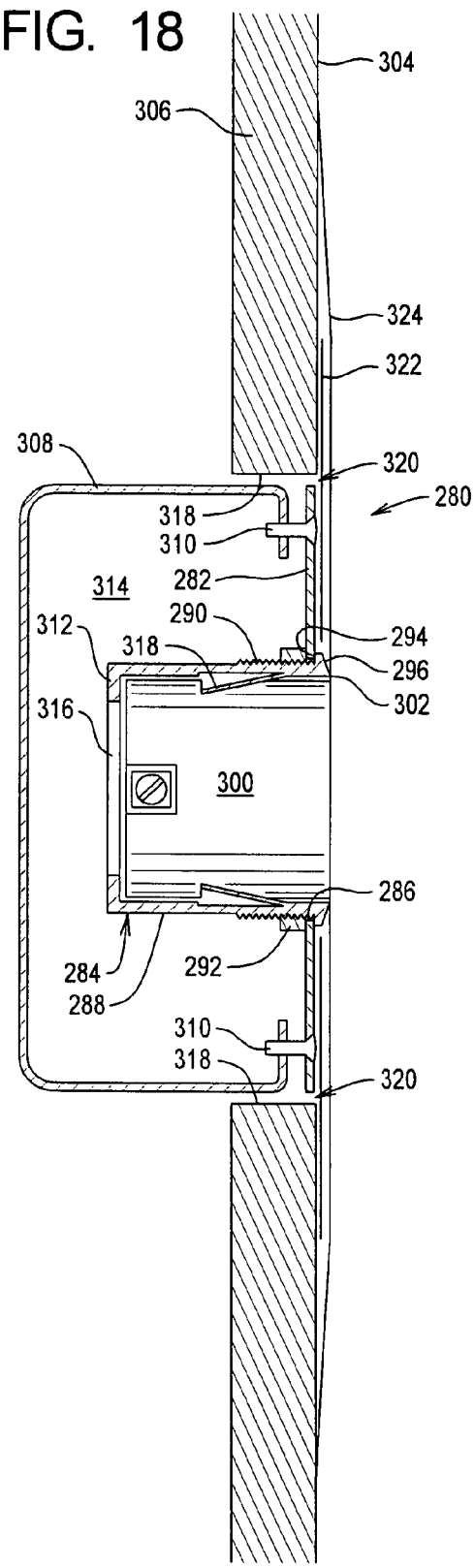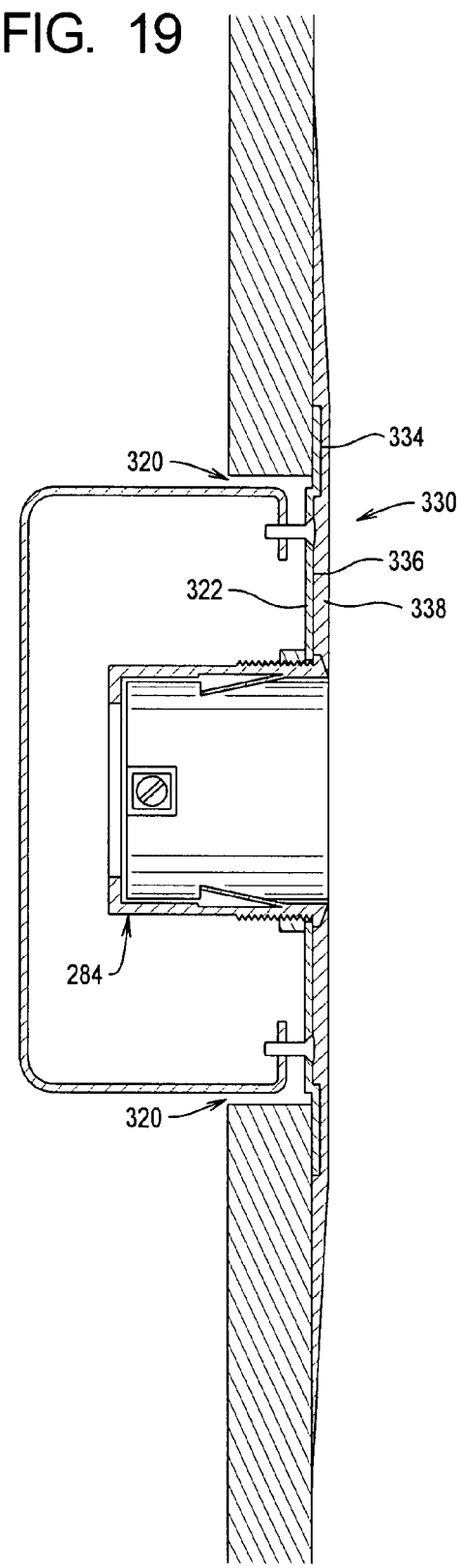

METHOD AND APPARATUS FOR FINISHED INSTALLATION OF ELECTRICAL OUTLET BOX WITHOUT USE OF EXTERNAL COVER PLATE

BACKGROUND a. Field of the Invention

The present invention relates generally to electrical junction and outlet boxes, such as are used for installation of electrical outlets and light switches, and, more particularly, to a method and apparatus that enables such boxes to be installed in the like without exposed cover plates visible when the installations are finished.

b. Related Art

Electrical outlet boxes (sometimes also referred to herein as junction boxes) are a ubiquitous feature of modern residential and commercial construction. Typically, the outlet box encloses one or more interchangeably mountable electrical outlets or switches, to which wires are run from within the surrounding wall structure, although in some instances sensors, lights and other components may be mounted in the outlet boxes; use with all such devices is contemplated by the present invention, and the term "outlet box" applies regardless of whether the device mounted therein is in an electrical outlet or serves some other function.

Despite advances in other areas of technology, electrical outlet boxes have remained little changed for at least the better part of a century. As is well known, outlet boxes ordinarily take the form of a shell (typically rectangular, although in some instances having a square, hexagonal or other shape) that is open at the front. The outlet box is nailed to a stud or otherwise mounted to the internal structure of a wall, with the open side facing toward the front. Wires are routed to the box and attached to the electrical outlet, switch or other component, which is then installed within the interior of the box. The open front of the box is then closed by a cover plate, having one or more openings through which the operative portion of the outlet, switch or other component protrudes.

This type of installation has been used for so many years that, from an aesthetic standpoint, most people now simply accept the presence of a visible cover plate as a necessary evil. Of course, numerous efforts have been made to improve the appearance of outlet box covers, but with very mixed results: At best, they have turned the cover plate into a more or less decorative article, while at worst, they have produced an even more pronounced eyesore; in recent years, the trend has been to simply make the cover plate plain and utilitarian in appearance, in an effort to minimize its visual impact as much as possible.

The cover plates of conventional outlet boxes therefore exist as visual distractions in otherwise attractively finished interiors, both residential and commercial. While the problem is perhaps most pronounced in high-end construction, where a refined appearance is sought, even modest homes could benefit aesthetically from the elimination of visible cover plates.

At the same time, it must be borne in mind that junction boxes serve important structural and safety functions, i.e., they provide support for the electrical component and also enclose the wire ends and contacts that would otherwise be exposed. The functional requirements of outlet boxes are frequently spelled out in building codes, from which deviation is neither desirable nor practical. Consequently, any aesthetic improvement cannot be made at the expense of violating codes or compromising the functions of the outlet box itself.

Accordingly, there exists a need for a method and apparatus that enables an outlet box housing an electrical outlet, switch or other interchangeable component to be installed into a wall without the presence of a visible cover plate. Furthermore, there exists a need for such a method and apparatus that yields an aesthetically satisfactory result. Still further, there exists a need for such a method and apparatus that enables an installation to be made quickly and efficiently, and without requiring special tools or skills. Still further, there exists a need for such a method and apparatus that utilizes economical parts and materials. Still further, there exists a need for such a method and apparatus that will comply with applicable building codes, including the ability to access the interior of the box for maintenance or replacement of the component that is housed therein, and that will not compromise the functions served by the junction boxes themselves.

SUMMARY OF THE INVENTION

The present invention has solved the problems cited above, and is a method and apparatus for forming an electrical outlet box installation with only the operative portion of the electrical component being visible on the wall in the finished installation. Broadly, the method comprises the steps of: (a) providing an electrical component that is mounted to an outlet box in a wall such that an operative portion of the electrical component projects through an opening in the wall to an outer surface thereof; (b) mounting a plate assembly over the outlet box, so that an inner edge of the plate assembly closely surrounds the operative portion of the electrical component and an outer edge of the plate assembly extends outwardly therefrom; and (c) applying a layer of fill material over the plate assembly and blending the layer into the surface of the wall around the assembly, so that when the installation is finished, substantially only the operative portion of the electrical component is visibly distinct from the surrounding surface of the wall. The step of mounting the plate assembly over the outlet box may comprise the step of mounting the plate assembly over both the outlet box and the opening in the wall.

The step of applying a layer of fill material over the plate assembly may comprise applying a layer of drywall mud over the plate assembly. The step of applying the fill material over the plate assembly may comprise applying the fill material over a front surface of the plate assembly that tapers outwardly from the opening towards the perimeter of the plate assembly.

The step of mounting the plate assembly over the outlet box may comprise mounting the plate member so that a forwardly projecting wall portion of the plate member closely surrounds the operative portion of the electrical component. The step of applying a layer of fill material over the plate assembly may comprise applying the layer of fill material over the outer surface of the plate assembly up to the projecting wall portion thereof.

The step of mounting the plate assembly over the electrical component and opening may comprise mounting a perimeter portion of the plate assembly to the surface of the wall surrounding the opening. The step of mounting the perimeter portion of the plate assembly to the surface of the wall may comprise applying a layer of adhesive material over the perimeter of the plate assembly so that the layer of adhesive material overlaps onto the surface of the wall so as to secure the plate assembly thereto. The step of applying a layer of adhesive material over the perimeter of the plate assembly may comprise applying a layer of adhesive tape material over the perimeter of the plate assembly. The step of applying the layer of adhesive tape material may comprise applying the layer of adhesive tape material over a thin, stepped portion formed about the perimeter of the plate assembly.

The step of applying a layer of fill material may comprise applying the layer of fill material over the front surface of the plate assembly and also over the layer of adhesive tape material on the stepped perimeter portion of the plate assembly. The step of mounting the plate assembly to the wall may comprise driving at least one fastener through the plate assembly, and the step of applying the layer of fill material may comprise applying the layer of fill material over a head portion of the at least one fastener.

The step of mounting the plate assembly over the electrical component and wall opening may comprise mounting a fixed plate member to the wall surface at an annular, spaced gap from the operative portion of the electrical component and detachably mounting a removable plate member in the annular gap so that the removable plate member can be removed to provide access to the electrical component without damaging the wall surface around the component. The step of applying the layer of fill material over the plate assembly may comprise applying the layer of fill material over both the fixed and removable plate members of the assembly.

The step of applying the layer of fill material over the plate assembly may comprise the steps of placing a cover over the operative portion of the electrical component; applying the fill material as a substantially continuous layer over the plate assembly and electrical component; and removing the cover from the operative portion of the electrical component so as to remove the layer of fill material therefrom. The step of placing a cover over the operative portion of the electrical component may comprise the step of installing a rigid cover or applying a strip of adhesive tape over the operative portion of the component.

The step of mounting the plate assembly over the electrical component may comprise mounting the plate assembly over the electrical component so that the operative portion of the electrical component is forward of the front surface of the plate member by a distance that is approximately equal to a predetermined thickness of a wall covering material, such as panelling or stone, for example. The method may further comprise the step of installing the wall covering material over the plate member so that the operative portion of the electrical component lies generally flush with the surface of the wall covering material.

The present invention further provides a plate assembly for covering an outlet box and electrical component so that essentially only an operative portion of the electrical component is visibly distinct when the installation is finished. Broadly, the plate assembly comprises at least one plate member that is mountable over an outlet box in which the electrical component is mounted, the at least one plate member comprising: (a) an opening for closely surrounding the operative portion of the electrical component, (b) a perimeter portion for extending outwardly over the outlet box, and (c) a front surface for being covered by a fill material that matches the front surface of said wall. The perimeter portion of the plate member may extend outwardly by a distance sufficient that the perimeter portion will overlay a front surface of the wall around the outlet box.

The front surface of the at least one plate member may comprise a sloped surface that tapers outwardly from the opening towards an outer edge having a reduced thickness that provides a smooth transition to the front surface of the wall. The back surface of the plate member may comprise a substantially flat surface for lying flat against the front surface of the wall surrounding the outlet box.

The operative portion itself may lie generally flush with the front surface of the plate member, or may be set forwardly therefrom by a distance approximately equal to a predetermined thickness of a wall covering material, such as panelling or stone, so that the operative portion will lie generally flush with a surface of the wall covering material when the latter is installed over the plate member.

The plate assembly may further comprise a projecting wall on the front of the plate member that borders the opening for the operative portion of the electrical component. The projecting wall on the plate member may have a height approximately equal to a predetermined depth of the layer of fill material over the plate member. The projecting wall may comprise a relatively thin upper edge and a sloped outer surface that extends downwardly and outwardly to meet the sloped front surface of the plate member at an obtuse angle.

The plate assembly may further comprise a thin, stepped perimeter portion formed about the outer edge of the plate member, for receiving a layer of adhesive tape material applied thereover.

At least one plate member may comprise an outer plate member for being fixedly mounted to the wall surface; a removable inner plate member that fits within the outer plate member and has the opening formed therein; and means for detachably mounting the inner plate member, so that it is removable to permit access to the electrical component without breaking the layer of fill material over the outer plate member. The means for detachably mounting the inner plate member may also comprise one or more screws that pass through the inner plate member, or may comprise one or more magnets or strips of hook-and-loop material mounted to the back side of the inner plate member.

The plate assembly may further comprise a receptacle member having an opening formed in one end and an interior for receiving the electrical component therein. The assembly may further comprise means for releasably retaining the electrical component in the interior of the receptacle member. The means for releasably retaining the electrical component in the interior of the receiver member may comprise at least one resiliently depressible locking finger for cooperatively engaging a notch on the electrical component. The interior of the receptacle member may be a substantially cylindrical interior for receiving a substantially cylindrical body portion of the electrical component. The plate assembly may further comprise means for mounting the receptacle member in the plate member at selected vertical or horizontal orientations The plate assembly may comprise one or more of the receptacle members mounted at substantially symmetrical locations in the plate member, or at substantially offset locations in the plate member.

The invention also provides an electrical component installation, comprising (a) a wall having an opening formed therein; (b) an electrical component mounted to the wall in an outlet box so that an operative portion of the electrical component is located at a front surface of the wall; and (c) a layer of wall surfacing material formed about the operative portion of the electrical component, so that essentially only the operative portion of the electrical component is visibly distinct from the surrounding wall when the installation is finished.

BRIEF DESCRIPTION OF THE DRAWINGS

FIG. 7 is a cross-sectional view of an outlet box installation made using a plate assembly having a removable section similar to that shown in FIGS. 4-6B, with the removable section being secured to the underlying structure by magnets rather than screws;

FIG. 8 cross-sectional view, similar to FIG. 7, of an outlet box installation made using a cover plate assembly in accordance with another embodiment of the present invention, in which the removable section of the plate assembly is secured in place by cooperating layers of hoop-and-loop fastener material;

FIG. 15A is a plan view of the cover plate assembly of FIG. 14;

FIG. 15B is a cross-sectional view of the cover plate assembly of FIG. 15A;

FIG. 18 is a cross-sectional view of an outlet box installation made in accordance with another embodiment of the present invention, in which the electrical component is received in a receptacle that is in turn in threaded engagement with the plate member, and also in which the edges of the plate member are set within the opening in the wall rather than extending outwardly over the surface of the wall;

FIG. 19 is a cross-sectional view of an outlet box installation made in accordance with another embodiment of the present invention, similar to that shown in FIG. 18, but in which the plate member has a thin perimeter flange that bridges the gap at the edges of the opening in the wall;

DETAILED DESCRIPTION

Figure 1:
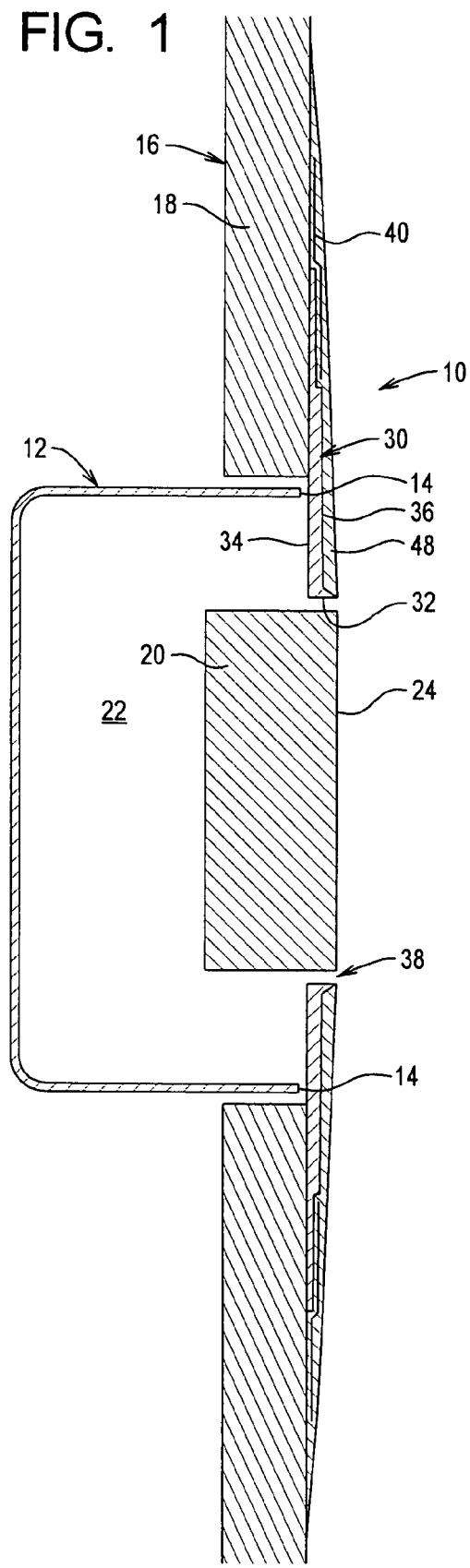
FIG. 1 is a cross-sectional view of an outlet box installed using a mudded-over plate assembly in accordance with the present invention, so that only the operative face of the electrical component itself is visible at the surface of the wall itself when the installation is finished.

FIG. 1 shows an outlet box installation 10 made in accordance with the present invention. As used in this description and the appended claims, the terms "outlet box" and "junction box" are interchangeable and include all forms of housings that contain electrical components of various types can be mounted such that some portion or portions of the components are exposed at the surface of a wall. Furthermore, the term "wall" includes not only structures having vertical surfaces, but also angled, contoured and horizontal surfaces, such as a concrete or wooden floor in which an outlet box is set, for example.

As can be seen, the installation 10 includes, in this embodiment, a conventional outlet box 12 that is mounted to a stud (not shown) or other support in the wall, so that the edges 14 at the open side of the box lie roughly flush with, or slightly recessed within, the front surface of the wall 16. In the installation that is shown, the wall is constructed of conventional sheetrock 18, which is the most common form in modern construction; it will be understood, however, that the wall may in some instances be constructed of plaster, masonry, panelling or other materials.

An electrical component 20 is mounted in the interior 22 of the junction box, so that its operative surface 24 is exposed at, and is generally flush with the surface of the wall 16; in the illustrated example, the electrical component is a double outlet, however as noted above the component may be a different type of outlet, a switch, a light or any other electrical device suitable to be mounted in an outlet box. The term "operative portion", as used in this description and the appended claims, refers to the interface or other portion of the electrical component that must be exposed at the wall surface in order for the component to perform its intended function, such as an outlet opening for an electrical cord, a toggle or button switch, an adjustment knob, a light or light fixture, a thermostat, a phone jack, and so on; in instances where the operative portion is flat it will, in general, preferably be mounted to lie flush with the surface of the surrounding wall, whereas in other instances (e.g., a toggle switch) the operative portion of the component may protrude somewhat and only its surround may be flush with the wall.

The installation 10 as described thus far is of a generally conventional form. In accordance with the present invention, however, the opening at the front of the outlet box is covered not by an exposed cover plate, but by a plate assembly having an upper surface that is in turn covered by wall surfacing material so as to not be visible when the installation is finished, leaving only the operative portion of the electrical component exposed to the eye.

In the embodiment illustrated in FIG. 1, the assembly is provided by a unitary plate member 30 that lies substantially flat against the wall surface, and has an opening 32 that conforms to and fits closely around the operative portion 24 of the electrical component. As can be seen in FIG. 1 and also FIG. 3B, the back surface 34 of the plate member is substantially flat (planar) to conform with the surface of the wall, while the front surface 36 is generally tapered or sloped outwardly away from the opening 32.

Referring again to FIG. 1, it can be seen that the plate member is installed by placing it over the opening of the junction box 12, preferably with a small gap 38 between it and the operative portion of the electrical component 20 (or the surround of the operative portion). The outer perimeter of the plate member is pressed flat against the wall, and is held in place by wallboard tape 40 or the like, which overlaps from the surface of the plate member onto that of the wall itself. As can be seen in FIG. 1 and also FIGS. 3A-3B, the perimeter of the plate member 30 is provided with a stepped portion 42 having a reduced thickness, which accommodates the height (thickness) of the wallboard tape, so that the upper surface of the tape lies substantially continuous with the main upper surface 36 of the plate member.

Figure 3B:
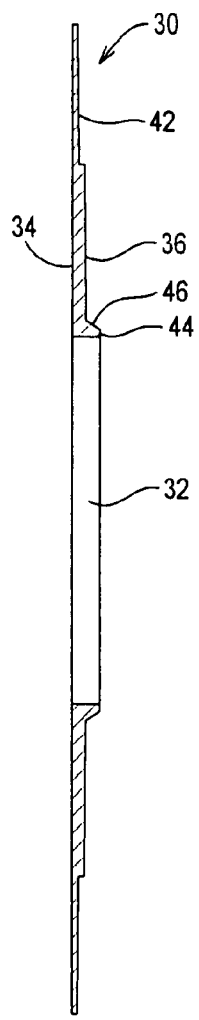
FIG. 3B is a cross-sectional view of the plate assembly of FIG. 3A.
Figure 3A:
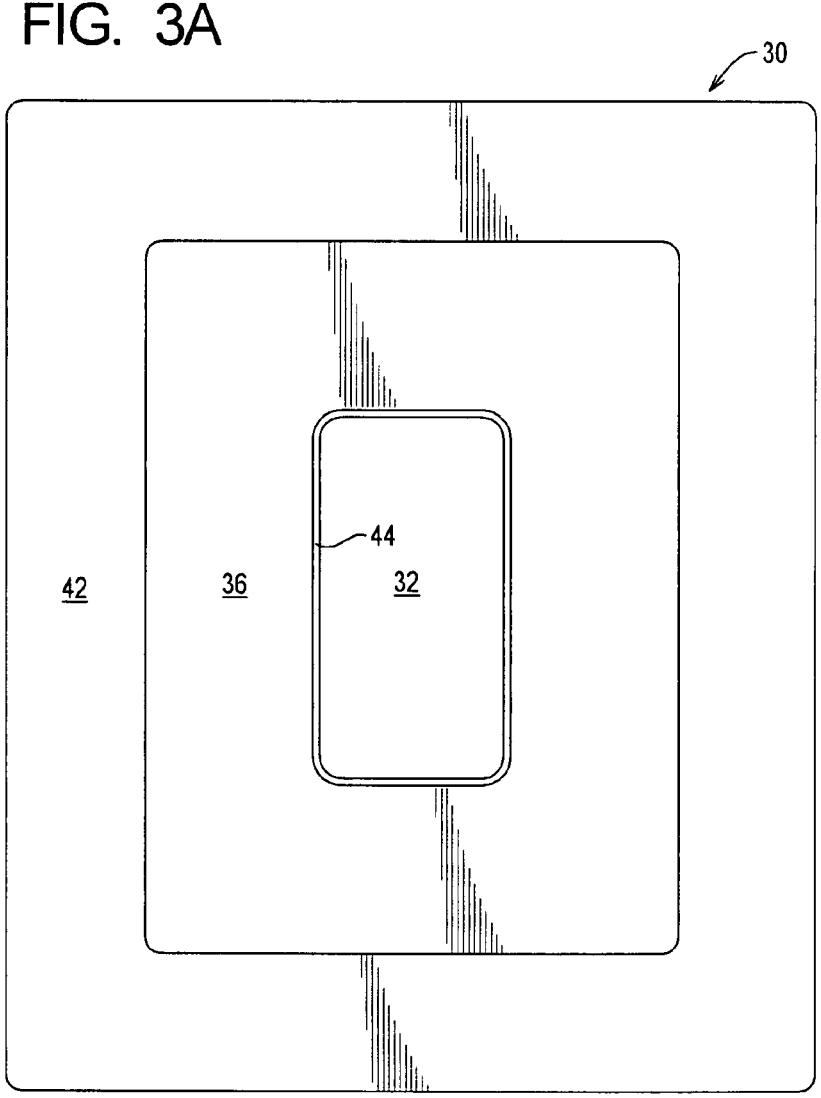
FIG. 3A is a plan view of the plate assembly of the installation of FIGS. 1-2.

Thus, when installed, a smooth, substantially continuous surface is formed atop and around the plate member 30. The sloped surface terminates in a projecting wall 44 around the opening 32; preferably, the height of the wall is such that its upper edge lies substantially flush with (i.e., coplanar) the surface or surround of the operative portion of the electrical component, with the outer surface 46 of the wall itself preferably being sloped outwardly as shown in FIG. 3B.

The plate member is preferably formed of molded plastic, although other materials (e.g., metal, fiberboard, and so on) may be suitable. Exemplary dimensions for the plate member are set forth in the following Table A:

TABLE A

| | |
|---|---|
| Overall Length | 178.5 mm |
| Overall Width | 145.0 mm |
| Length of Opening | 66.5 mm |
| Length of Opening | 33.0 mm |
| Thickness of Stepped Perimeter | 0.5 mm |
| Thickness at Outside Edge of Tapered Surface | 1.0 mm |
| Thickness at Inside Edge of Tapered Surface | 1.5 mm |
| Thickness at Inside Wall | 3.5 mm |

It will be understood that the forgoing dimensions are provided by way of illustrating one preferred embodiment, and may vary in other embodiments depending on a variety of design factors.

In addition to, or in place of, the use of wallboard tape, the plate member may be secured to the wall surface by an adhesive or by screws or other suitable fasteners, in which embodiments the stepped perimeter 40 may be dispensed with, if desired.

After the plate member has been mounted to the wall surface in the manner described, a layer of wallboard "mud" 46 is applied over the surface 36 of the plate member and the wallboard tape 40, with the outer edges of the layer being feathered into the surface of the wall 16. The sloped surface 36 and stepped perimeter 40 cooperate with the wallboard tape to form a continuous, sloped surface such that the mud layer 46 has a substantially uniform thickness over the surface of the plate, which in turn allows the installer to form a smooth, virtually imperceptible mound of mud with only a couple of quick swipes of a trowel. As the mud is being applied, the wall 44 provides an inner boundary, with the plastic (or other material) of the wall protecting the edge of the layer 46 from subsequent chipping or other damage after it is cured and over the life of the installation; the sloped outer surface 46 of the wall 44 that meets the surface 36 at an obtuse angle, providing a greater surface area (as opposed to a perpendicular wall) for adhesion/support of the mud or other fill material while at the same time minimizing the width of the lip (of wall 44) that is exposed in the completed installation. The surfaces of the plate member may also be provided with texturing, perforations, or other features to enhance adhesion of the fill material.

Figure 2:
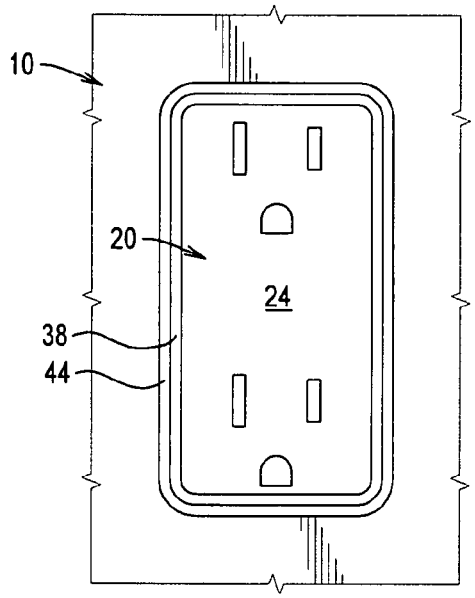
FIG. 2 is an elevational view of the installation of FIG. 1, showing the manner in which only the operative face of the outlets or other electrical component can be seen at the surface of the wall.

Once the mud or other fill material is cured, the installation is complete and may be painted, covered with wallpaper, and so on. As is shown in FIG. 2, essentially all that can be seen (as distinct from the surrounding surface of the wall) is the operative portion 24 of the electrical component (i.e., the outlet surfaces in the example that is shown); the thin upper lip of the wall 44 will generally be covered by paint and therefore virtually invisible. As compared with traditional installations using exposed cover plates, the visual impact of the installation is minimized and the finished appearance is greatly enhanced.

The wallboard "mud" described above is a relatively fluid, paste-like material that is well known to those skilled in the relevant art and that is very commonly used in interior finishing work, particularly when finishing sheetrock (gypsum board) walls. Wallboard tape is similarly ubiquitous in such work. As a result, installation of the plate member in accordance with the present invention requires no special materials, and uses only materials, tools and skills that the installer will already normally possess. It will be understood, though, that other types of fill materials may be used to form the layer over the plate member, such as other forms of paste and fluid materials that cure to form a surface matching that of the surrounding wall, or that panelling, wallpaper, or other wall surfacing may be placed over the top of the plate member rather than using a built-up layer of fill material. Similarly, other forms of tapes or securements may be used in place of the wallboard tape that has been described.

Figure 4:
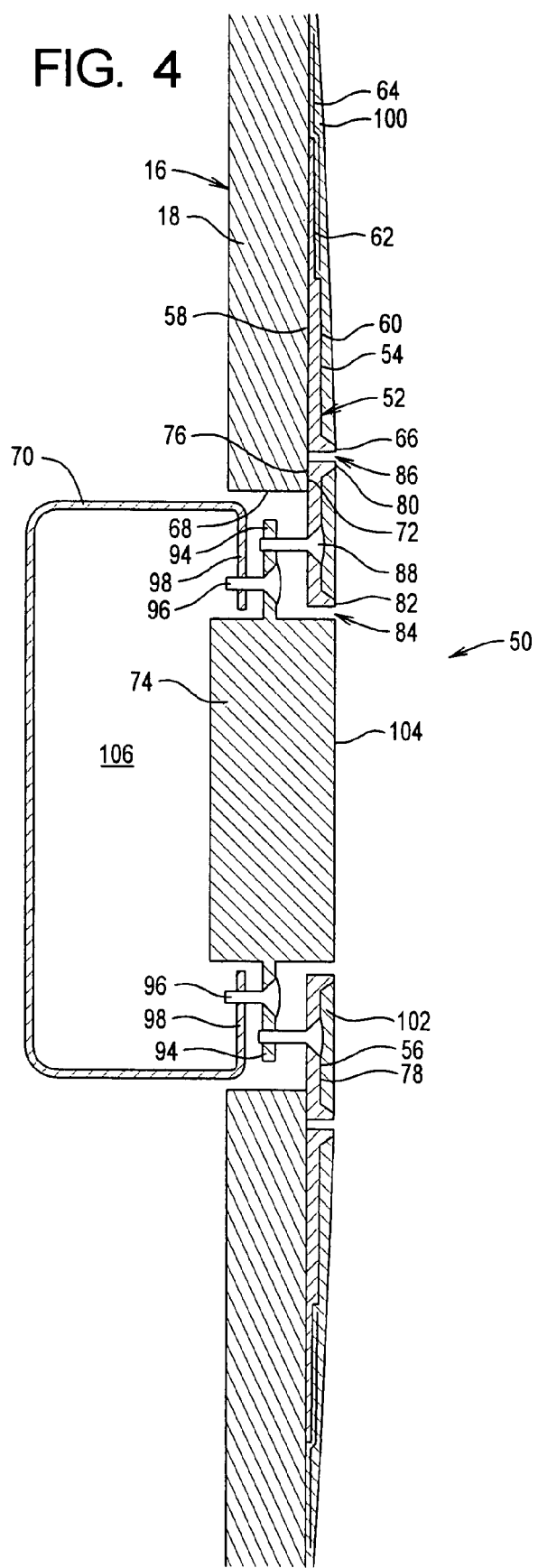
FIG. 4 is a cross-sectional view of an outlet box installation made using a plate assembly in accordance with a second embodiment of the present invention, in which the plate assembly includes an inner section that is removable to provide access to the interior of the outlet box and the electrical component.

Building codes in some jurisdictions require that the electrical component be accessible without disturbing the surface of the wall. FIG. 4 shows an installation that meets this requirement: As can be seen, rather than using a unitary plate member, this embodiment has a two-piece plate assembly 52 made up of an outer, fixed section 54 and an inner, removable section 56. The outer stationary member 54 corresponds to the plate member 30 described above, and likewise includes a flat back surface 58, sloped front surface 60 and stepped perimeter 62 that accommodates the wallboard tape 64; the principal difference is that the wall 66 of the outer plate member does not adjoin the operative portion of the electrical component itself, but instead defines an opening sufficiently large that its inner perimeter surrounds, but does not extend inwardly over, the edge 68 of a standard-sized cutout for the junction box 70, leaving a small step or shelf 72 on the surface of the wall around the edges of the opening.

The inner, removable plate member 56, in turn, is configured and sized to fit over the shelf 72 of the opening, so as to fill the gap between the fixed plate member 54 and the operative portion of the electrical component 74. The removable plate member includes a flat back surface 76 that corresponds to that of the fixed plate member, and a front surface 78 that likewise corresponds to that of the fixed member and that is surrounded by outer and inner forwardly projecting rims or walls 80, 82. As can be seen in FIG. 4, the outside distance between the two walls 80, 82 is slightly less than the distance between the inner edge of the fixed plate member 54 and the operative portion of the electrical component 74, consequently forming narrow gaps 84, 86 along the outer and inner edges of the removable plate member 56.

Figure 6B:
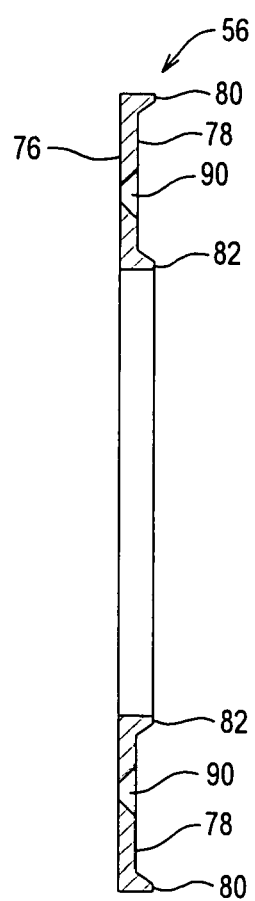
FIG. 6B is a cross-sectional view of the removable plate section of FIG. 6A.
Figure 6A:
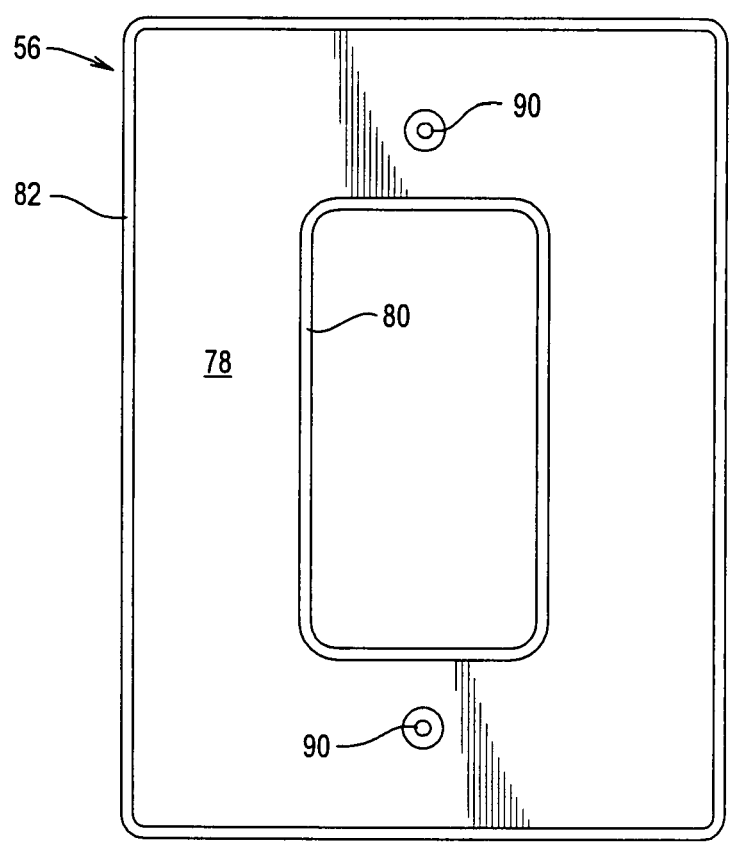
FIG. 6A is plan view of the removable section of the plate assembly of FIG. 5.

The depth of the fill area over the front surface 78 of the removable plate member 56 substantially matches that over the front surface of the fixed plate member 54. Screws 88 pass through countersunk bores 90 (see FIGS. 6A-6B) in the removable plate member, and are received in cooperating threaded bores formed in flanges 94 that extend from the sides of the electrical component 74; the flanges may be formed as an integral portion of the electrical component, or may be formed on a separate piece or pieces that are mounted thereto. The electrical component itself is secured to the outlet box 70 by screws that pass through a second set of bores in outlet flanges 94, and that are received in cooperating threaded bores in flange portions 98 of the box.

Thus, when the screws are inserted and tightened, the removable plate member 56 is held in substantially coplanar relationship with fixed plate member 54, with its outer edge supported on the lip 72 of the wall opening. Drywall mud or other fill material is then applied in substantially the same manner as described above, creating level fill areas 100, 102 over the tops of both of the plate members. A knife or other implement is then run along the gaps 84, 86, to keep the removable plate member 56 free from being adhered to the stationary plate member 54 and the electrical component 74.

Figure 5:
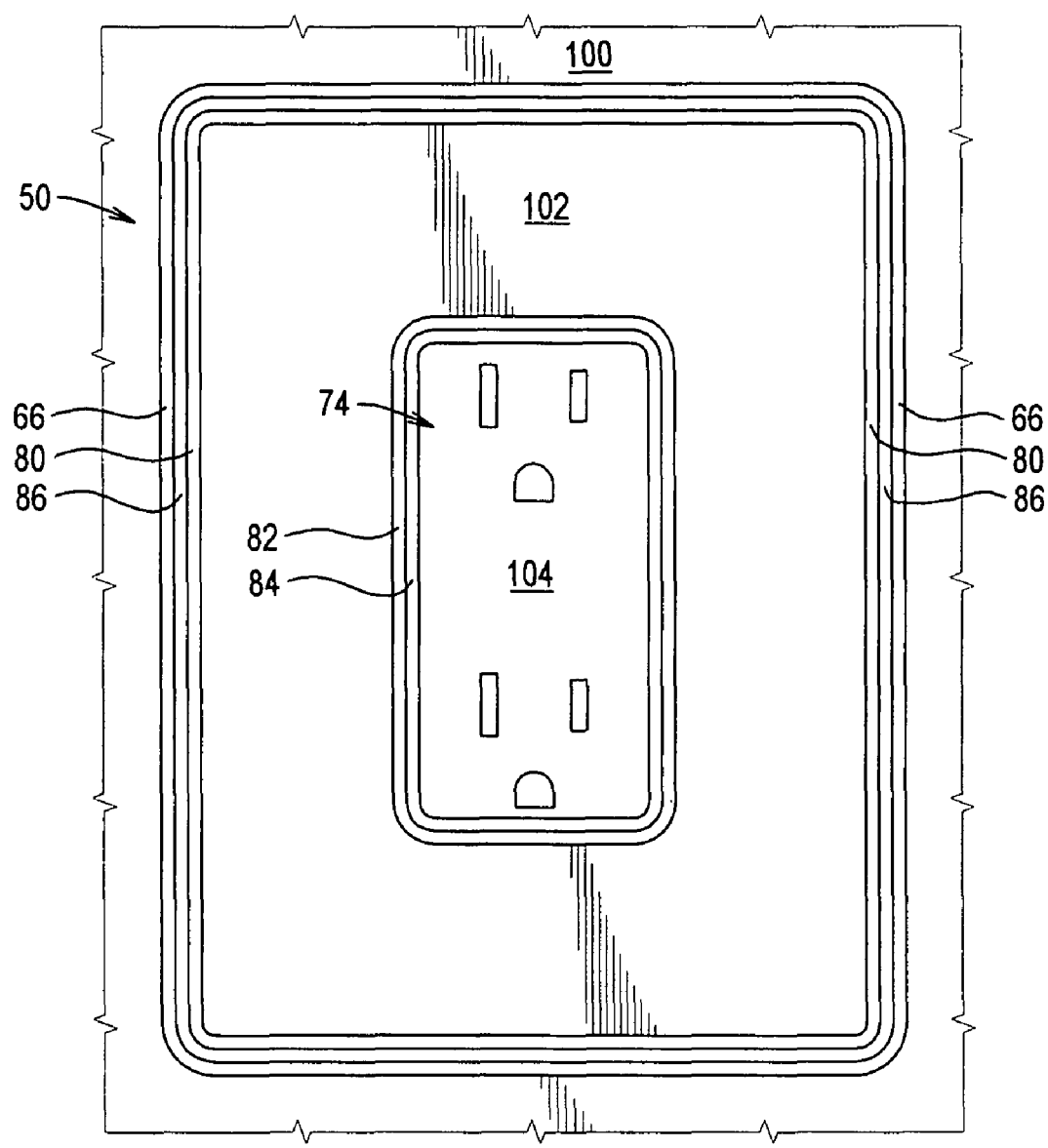
FIG. 5 is an elevational view of the outlet box installation of FIG. 4.

When the installation is thus completed, as shown in FIG. 5, the operative portion 104 of the electrical component is again essentially the only thing visible, the presence of the removable plate member being betrayed only by the narrow slit-like gap 86, which is virtually invisible when standing away from the wall.

At such time as it becomes necessary to remove/replace the electrical component 74 or access the interior 106 of the junction box, a small area of the fill layer 102 is chipped out to expose the screws 88, which are then withdrawn to permit removal of the inner plate member 56. A pry tool, such as knife or screwdriver, can be inserted into one of the other of the gaps 84, 86 to help free the plate member, if necessary. After the plate member 56 has been replaced, the areas over the screws can be repaired by applying a small amount of spackling compound or similar material.

FIGS. 7 and 8 show embodiments of the invention similar to that of FIGS. 4-6B, except that the removable plate member is secured by alternate mechanisms that are not visible in the finished installation but that do not require chipping out or otherwise removing fill material to gain access to the junction box/electrical component. Like reference numerals will be used in FIGS. 6-7 for like components shown in FIG. 4.

In particular, FIG. 7 shows an installation 110 in which the removable plate member 112 is detachably mounted to the flanges 114 of the electrical component by pairs of magnets 116*a*, 118*a* and 116*b*, 118*b*; the plate member 112 can therefore easily be removed by inserting a knife or similar implement into one or the other of the slots 120, 122 at the edges of the plate member and exerting a prying force in order to separate the magnets. FIG. 8, in turn, shows an installation 130 in which the removable plate member 132 is secured to the underlying flanges 134 of the electrical component by cooperating strips 136a, 138a and 136b, 138b of hook-and-loop fastener material, e.g. VELCRO™; the strips of hook-and-loop material can likewise be separated by inserting a knife or other implement in gaps 140, 142 and exerting a prying force.

FIGS. 7 and 8 also show that the removable plate member may optionally be provided with a preformed front surface (e.g., molded of the same plastic or other material as the main plate member itself), rather than having a channelled or recessed area for drywall mud or other fill material. While perhaps not as elegant as the completely filled-over installation that is shown in FIG. 4, this version is nevertheless significantly sleeker and less obtrusive than a traditional cover plate.

Figure 9:
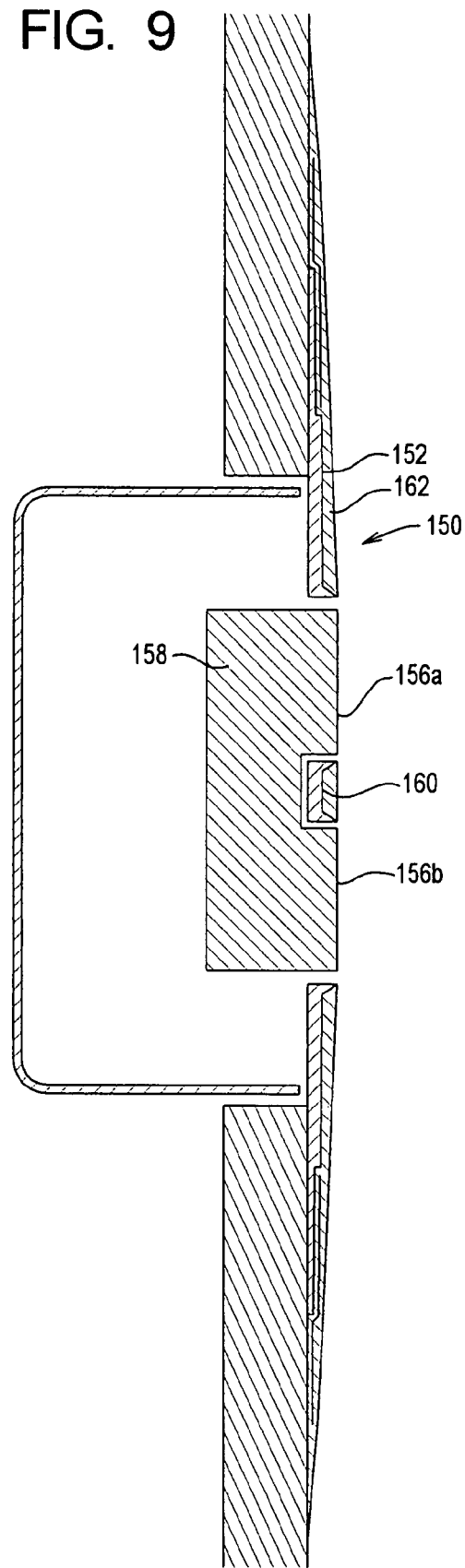
FIG. 9 is a cross-sectional view of an outlet box installation made using a plate assembly in accordance with another embodiment of the present invention, in which the mudded-over plate surrounds each of the outlet openings separately, so that they are exposed individually rather than grouped together in a single surface as in FIGS. 1-2.
Figure 10:
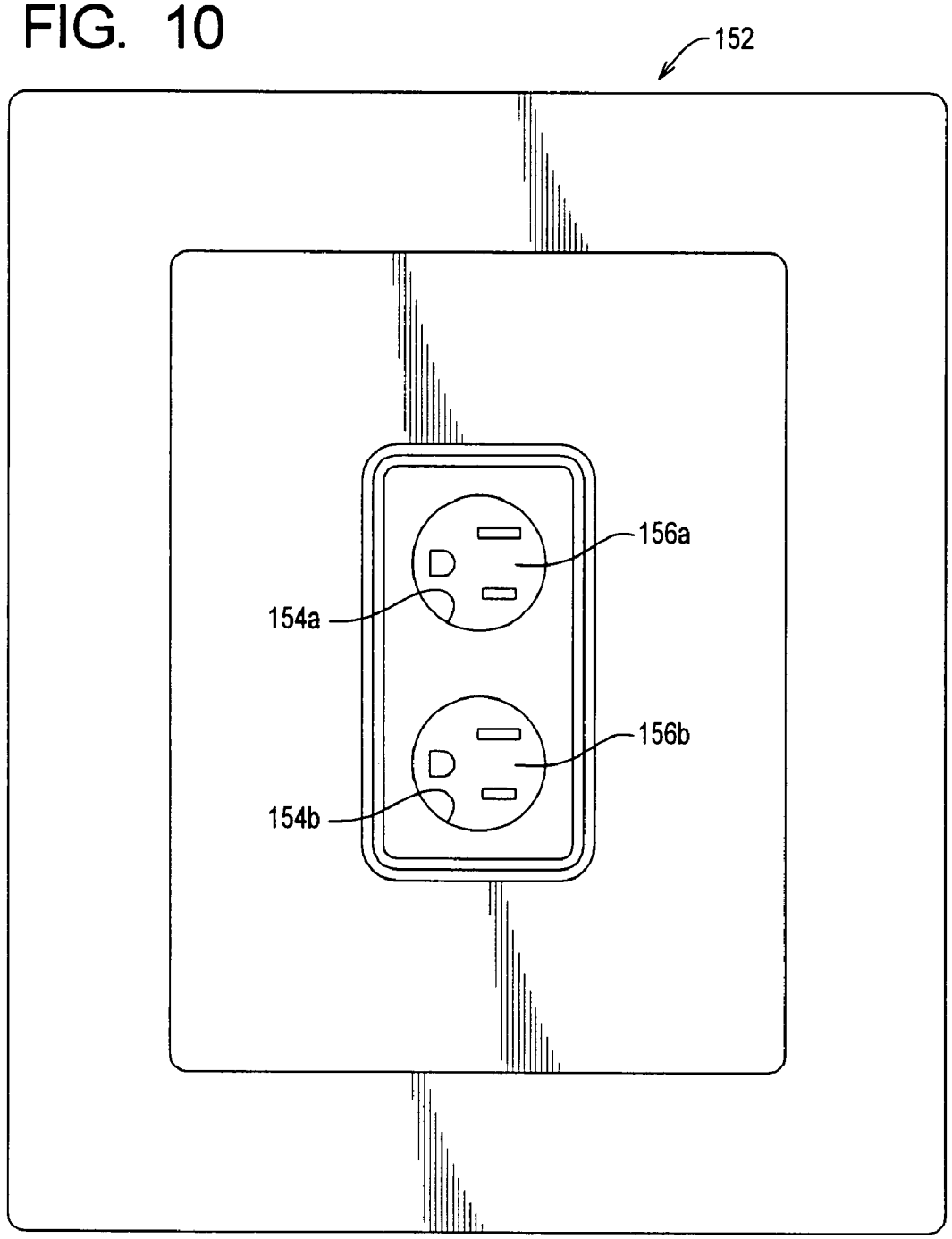
FIG. 10 is a elevational view of the plate assembly of FIG. 9, showing the manner in which the outlets are exposed individually at the openings therein.

FIGS. 9-12 show installations using plate assemblies having openings for electrical components that have round rather than rectangular operative surfaces. In particular, FIG. 9 shows an installation 150 using a plate member 152 having first and second circular openings for the round-faced outlets 156a, 156b of electrical component 158. The plate member includes a bridge portion 160 that extends between the two outlet faces, and that is filled with the same layer 162 of wallboard mud or other fill material as the rest of the plate member and surrounding area.

Figure 11:
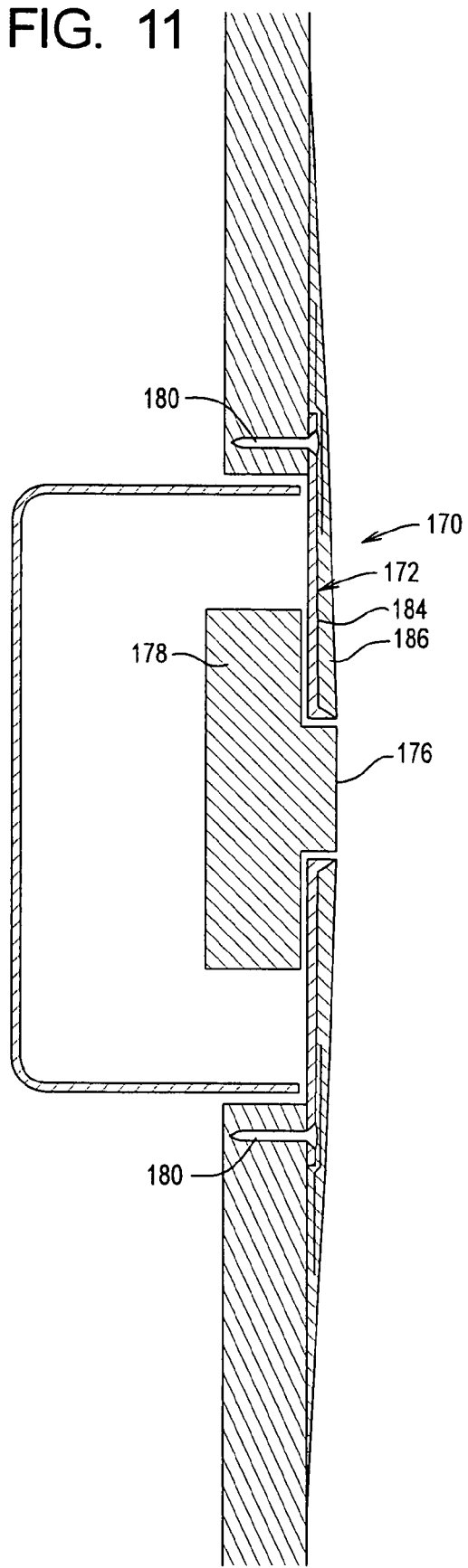
FIG. 11 is cross-sectional view, similar to FIG. 9, of a junction box installation made using a plate assembly in accordance with an embodiment similar to that in FIGS. 9-10, except that the plate assembly has a single opening for the electrical device rather than two.
Figure 12:
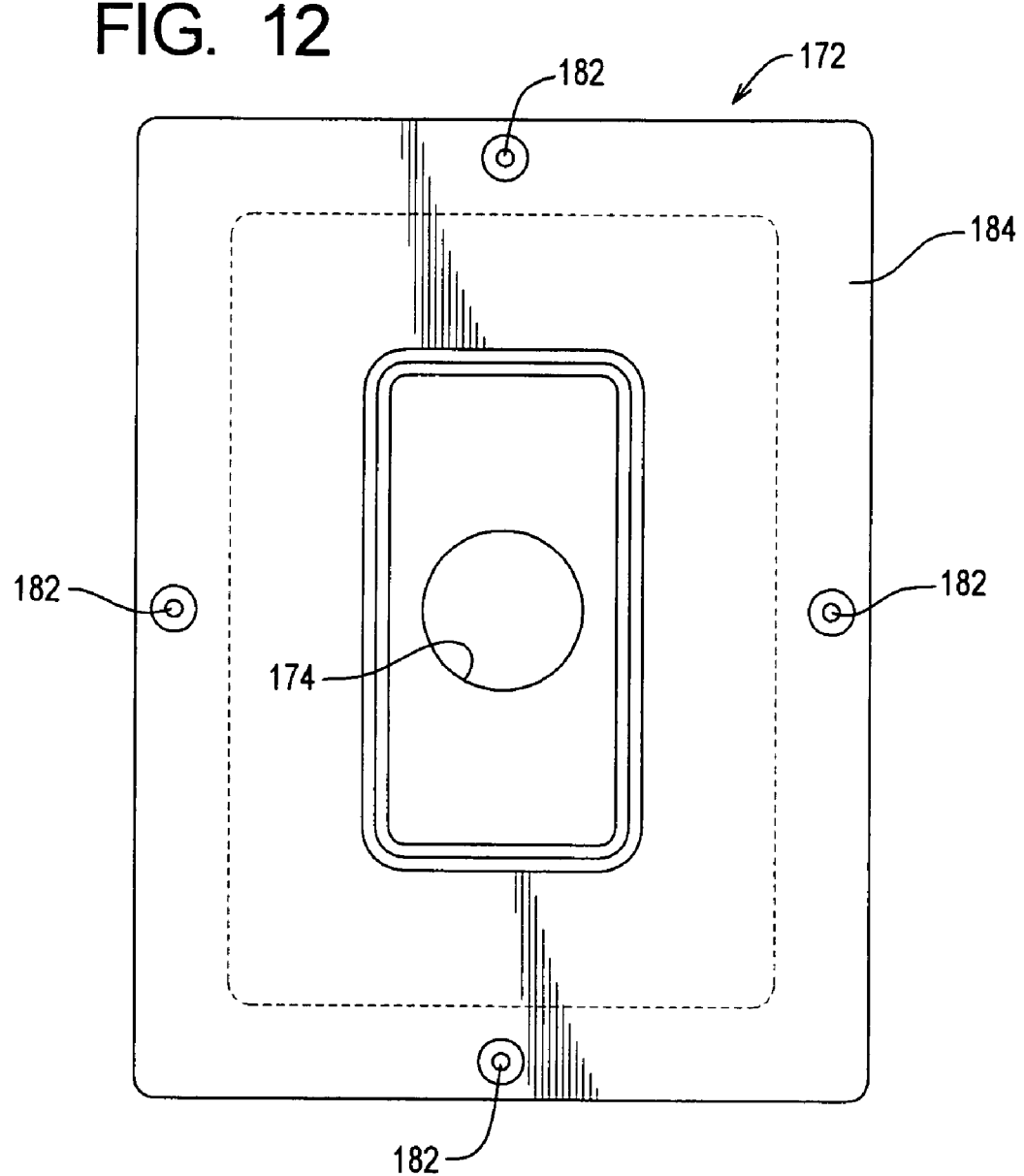
FIG. 12 is elevational view of the cover plate of FIG. 11, showing the single opening through which the operative portion of the electrical component, such as a push button switch or a light assembly for example, protrudes.

FIG. 11, in turn, shows an installation 170 made using a plate member 172 having a single circular opening 174 (see FIG. 12) that surrounds the round operative surface 176 of the electrical component 178, e.g., a single electrical outlet or a pushbutton switch. The plate member 172 of FIGS. 11-12 also differs from those described above in being secured to the surrounding wall by screws 180 or similar fasteners that pass through cooperating openings 182 in the plate member and into the underlying material of wall. The use of screws rather than wallboard tape permits the stepped perimeter described above to be eliminated, although if desired it may still be included to permit alternate forms of mounting. The plate member 172 also illustrates an embodiment in which the upper surface of the plate member may be flat, rather than sloped/tapered as, described above. This simplifies the construction of the plate member and also provides a thicker, potentially more durable buildup of fill material around the opening, although at the expense of possibly requiring additional and more careful forming/shaping of the fill layer 186.

FIGS. 13A-13G illustrate sequential steps in forming an installation using a plate assembly in accordance with the present invention. For clarity, certain surrounding structures and materials (e.g., wall studs) are not shown.

Figure 13A:
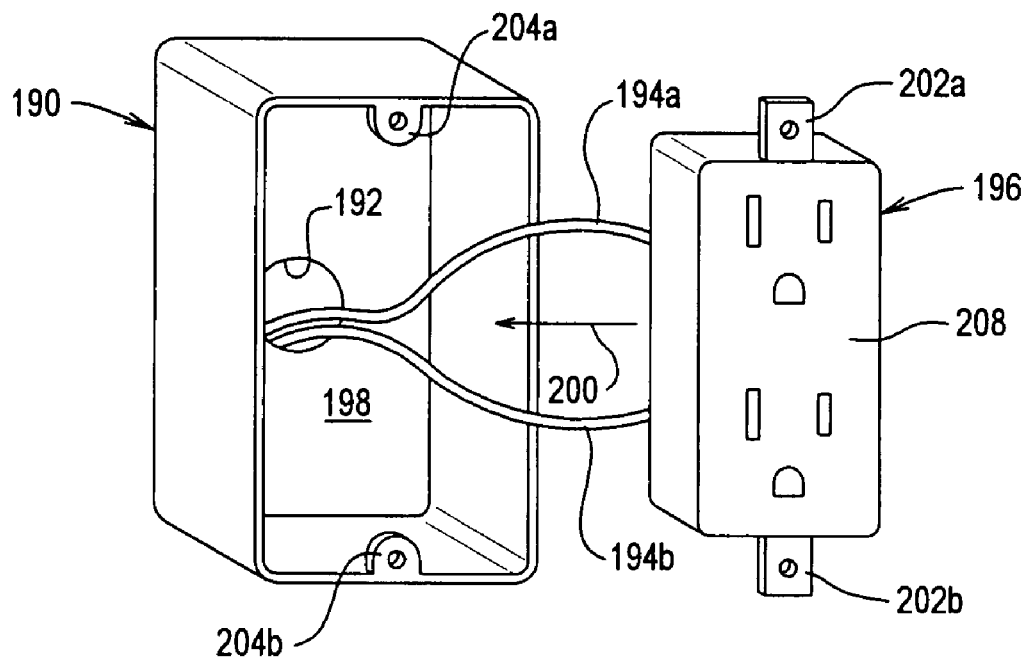
FIGS. 13A-G are sequential, perspective views, showing the steps in forming a junction box installation using a plate assembly in accordance with the method of the present invention.
Figure 13B:
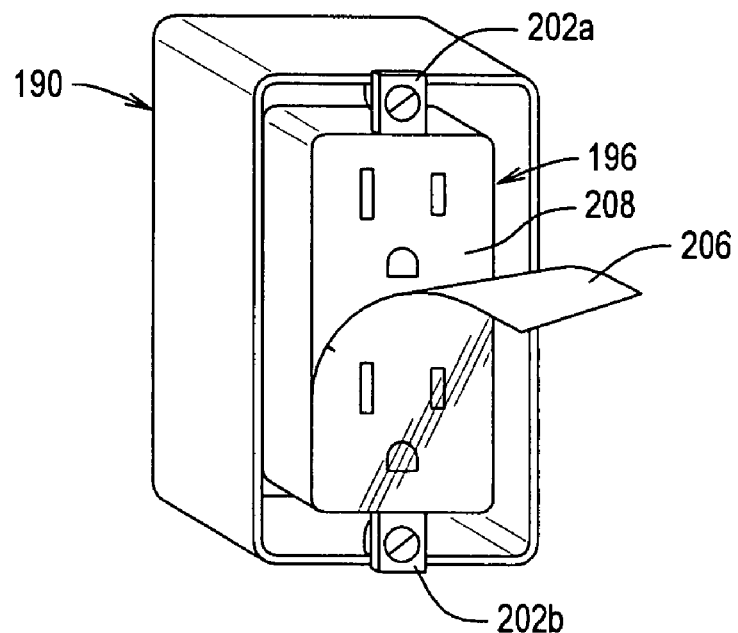

FIG. 13A shows an outlet box 190 having a knockout opening 192 in one of its walls, through which at least one set of wires 194a, 194b are pulled. The wires are connected to the electrical component 196 (in this example, a double electrical outlet) in a conventional fashion. The electrical component is then inserted into the open interior 198 of the outlet box, in the direction indicated by arrow 200, and secured in place by screws (not shown) that are passed through openings in flanges 202a, 202b on the electrical component and into threaded bores 204a, 204b at the front of the outlet box. A piece of adhesive tape 206 or similar removable material is then placed over the operative surface 208, as shown in FIG. 13B; for ease of understanding, the tape strip 206 is shown as being transparent, however it will be understood that in many or most instances the material (e.g., masking tape) will be opaque.

Figure 13C:
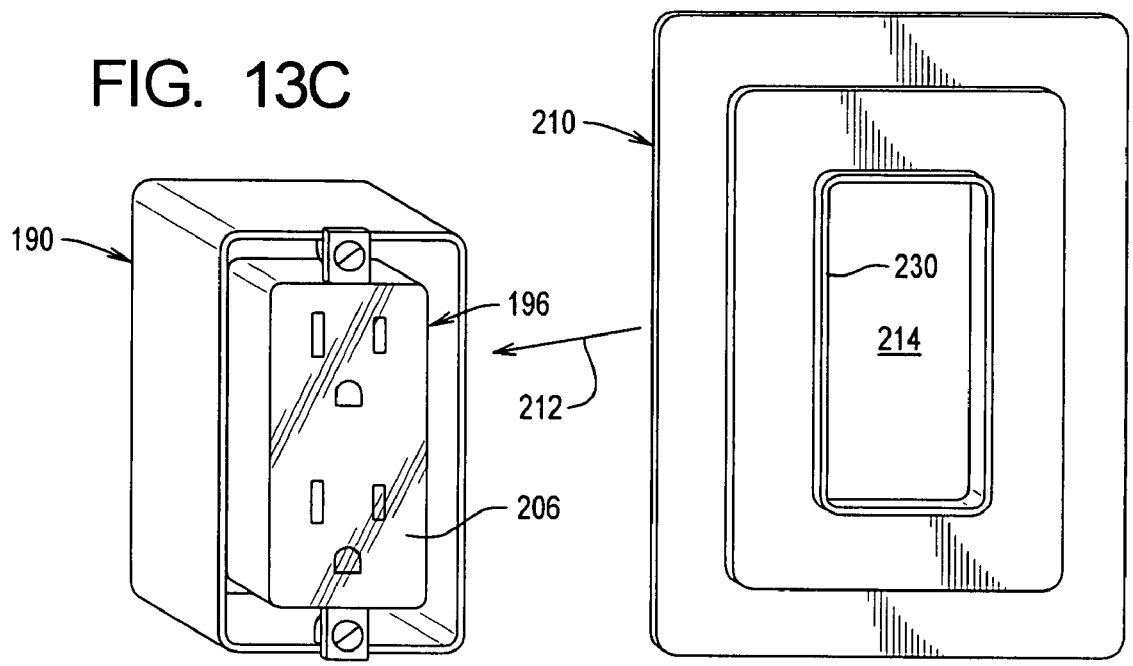
Figure 13D:
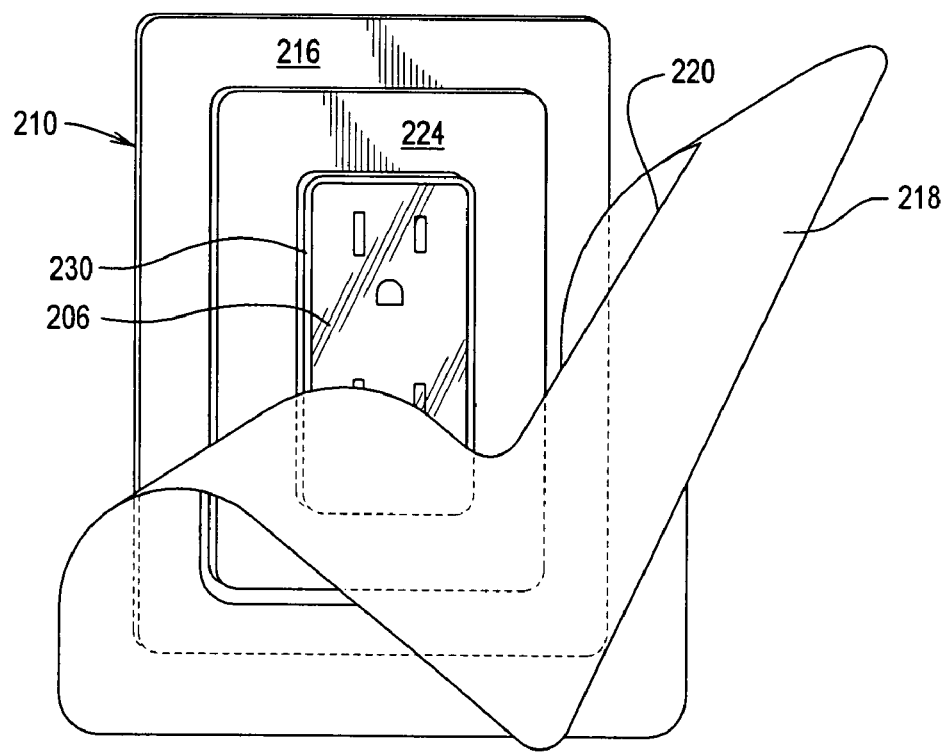
Figure 13E:
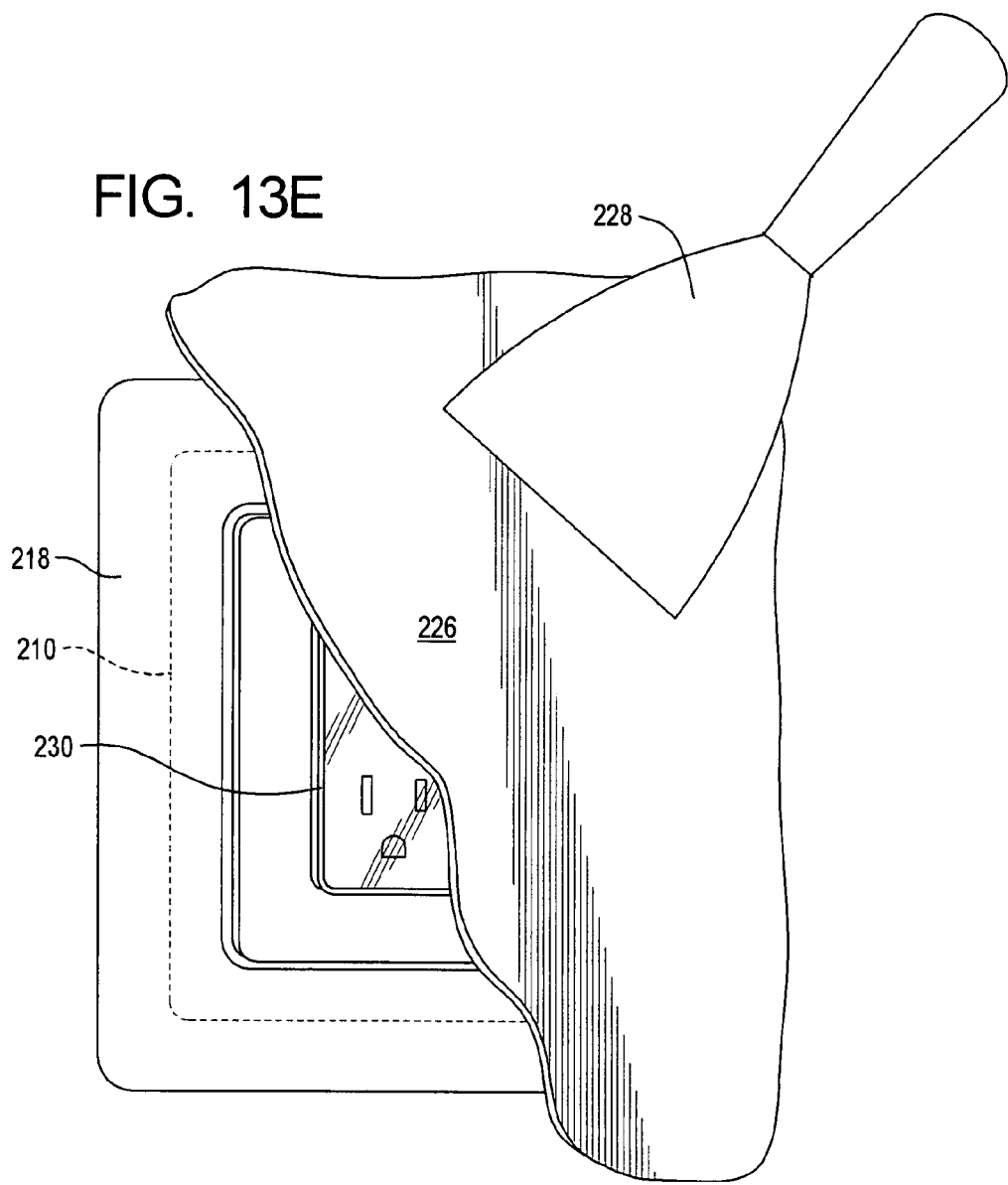

Next, the plate member 210 is placed over the front of the outlet box, in the direction indicated by arrow 212 in FIG. 13C, so that the back surface of the plate member rests flat against the surrounding wall surface (not shown) and the operative portion of the electrical component 196 is received within the correspondingly shaped opening 214 of the plate member. Wallboard tape is then laid over the stepped border 216 of the plate member so that it also extends outwardly over the surrounding wall surface, thus holding the plate member firmly in place. In the example shown in FIG. 13D, the wallboard tape (or similar adhesive sheet material) is formed as a single patch 218 with a central cutout opening 220 that is sized to fit around the main surface 224 of the plate member, which facilitates rapid and convenient mounting of the plate member; it will be understood, however, that a series of straight strips of tape (or similar material) may be laid over the border around the plate member, rather than using a unitary adhesive patch as shown.

Mounted as described, the plate member surrounds the operative face 206 of the electrical component and covers the opening of the outlet box. A layer of wallboard mud 226 or other fill material is then spread over the entire area, using a spatula 228 or other suitable finishing tool. The fill material is spread out beyond the edges of the tape 218 holding the plate member to the wall, and feathered into the wall surface, so that the fill layer will blend into the wall and its outer edges will not be discernable. The protruding wall 230 around the component opening cooperates with the blade of the spatula or other finishing tool to act as a depth guide when forming the layer, allowing the installer to apply/remove fill material so that the upper edge of the wall is only barely exposed, and also ensures an even lip all around the opening. The narrow exposed edge of the wall is subsequently painted over, and therefore invisible when the installation is finished.

Figure 13F:
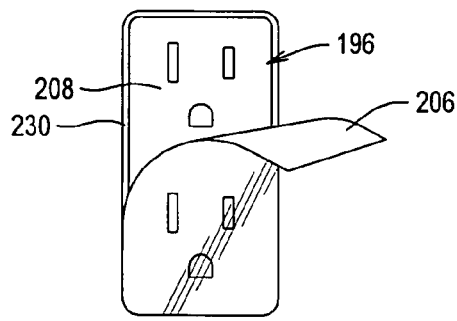

Depending on the consistency and other characteristics of the mud or other fill material, the material is allowed to partially or fully cure, and the strip of tape 206 is then removed to expose the operative surface 208 of the electrical component 196, as shown in FIG. 13F. In so doing, the exposed edge of the wall 230 provides the installer with a visual reference, so that a knife or other tool can be used to help peel up the strip 206 without damaging the surrounding layer of fill material.

In place of the tape a cover plate, such as a rigid plastic member, may be installed over the operative surface of the electrical component. The fill material can be applied over both the plate member and the cover piece in the manner described above and allowed to cure, after which the user can sand the fill material down until the cover piece is exposed. The cover piece can then be pried or popped off to expose the operative portion of the component.

Figure 13G:
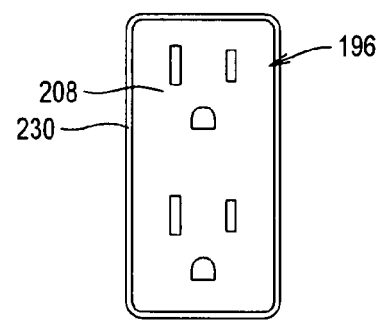

With the installation thus completed, only the operative surface 208 of the electrical component and the thin edge of wall 230 are visible at the wall surface (for ease of understanding the latter is shown somewhat larger than normal in FIG. 13G).

As discussed above, building codes frequently require that it be possible to remove the electrical component without breaking the surface of the wall. Rather than an assembly using fixed and removable plate members as previously described, the installation 210 in FIG. 14 meets this requirement using an assembly 212 in which there is a single, fixed plate member 214 and a receptacle member 216 mounted to the plate member that receives an electrical component 218 in a "plug-in" fashion; given that the electrical component is specially configured rather than being of a conventional type, this embodiment is particularly suited to new construction applications, whereas the embodiments described above are generally more suited to retrofit installations.

In the installation 212, the front of the plate member 215 is generally similar to that described above, having a sloped surface 220 and stepped perimeter surface 222 that accommodates the wallboard tape 224; likewise, the back face of the plate member 214 includes a flat surface 226 that extends out over the opening and surface of the wall 228. Similarly, the interior 236 of the outlet box encloses the inwardly protruding ends of the receptacle member 216 and electrical component 218, as well as the wiring 238 that is connected to the latter.

However, as can be seen in FIGS. 15A-15B, the opening 240 in the plate member 214, rather than bordering directly on the electrical component itself, instead receives the receptacle member 216. As can be seen in FIG. 15A, the opening 240 is preferably circular, with alignment notches 242a-d being formed in its perimeter. The receptacle member (see FIGS. 16A-16D), in turn, includes a cooperatingly-shaped, generally cylindrical body 244 that is sized to fit closely within the opening 240 of the plate member, with alignment tabs 246a, 246b that are received within the notches about the perimeter of the opening; the cooperating tabs and notches thus allow the receptacle member to be installed in the plate member at 90° increments of rotation, so as to be able to mount the associated electrical component in a vertical or horizontal orientation as desired, with finer increments of adjustment being possible by increasing the number of locking positions.

Figure 14:
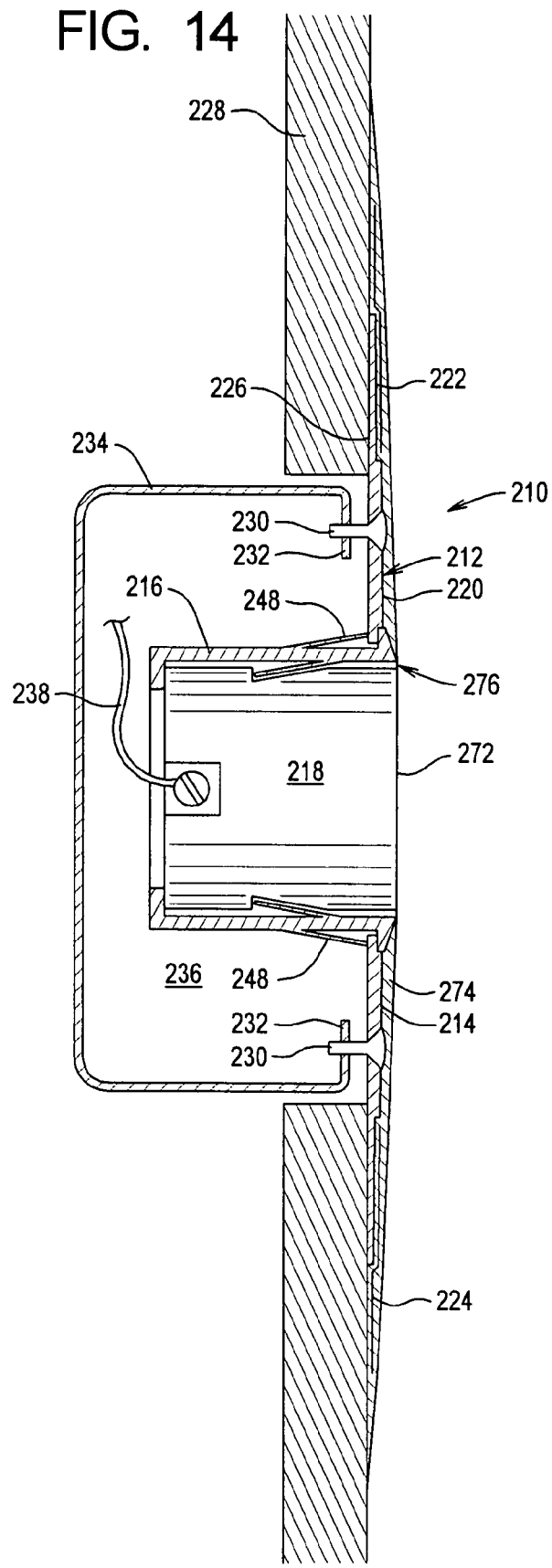
FIG. 14 is a cross-sectional view of an outlet box installation made using a plate assembly in accordance with another embodiment of the present invention, which includes a receptacle for plug-in mounting of cooperatingly configured electrical components.
Figure 16A:
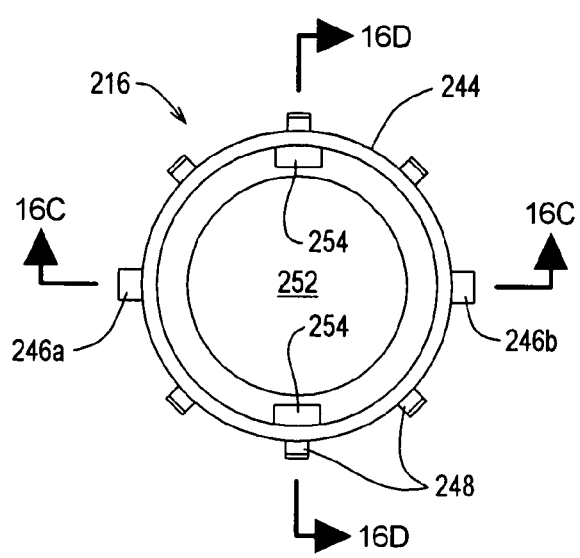
FIG. 16A is a plan view of the receptacle member of the cover plate assembly of FIG. 14.
Figure 16B:
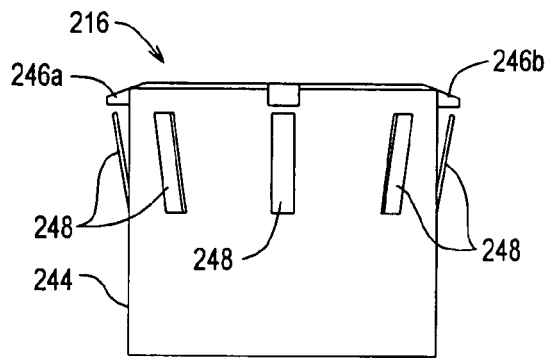
FIG. 16B is an elevational view of the receptacle member of FIG. 16A, showing the projecting alignment tabs and locking fingers on the exterior thereof.
Figure 16C:
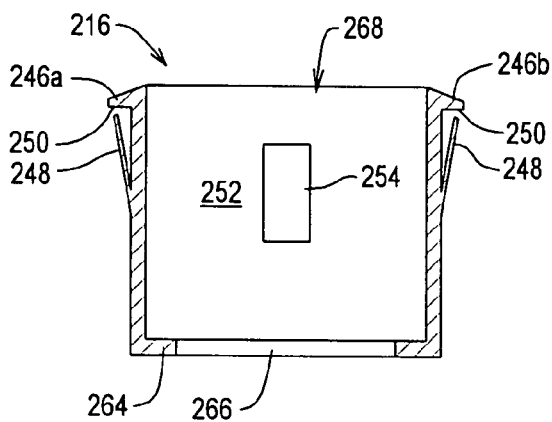
FIG. 16C is a first cross-sectional view of the receptacle member of FIG. 16A, taken along line 16C in FIG. 16A, showing the external and internal alignment tabs of the receptacle member in greater detail.
Figure 16D:
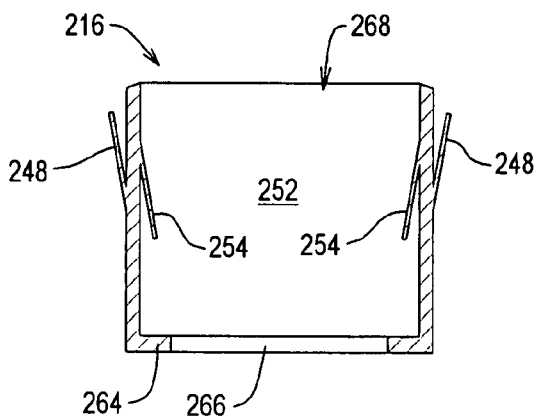
FIG. 16D is a second cross-sectional view of the receptacle member of FIG. 16A, taken along line 16D in FIG. 16A, showing the configuration of the external and internal locking features in greater detail.
Figure 17A:
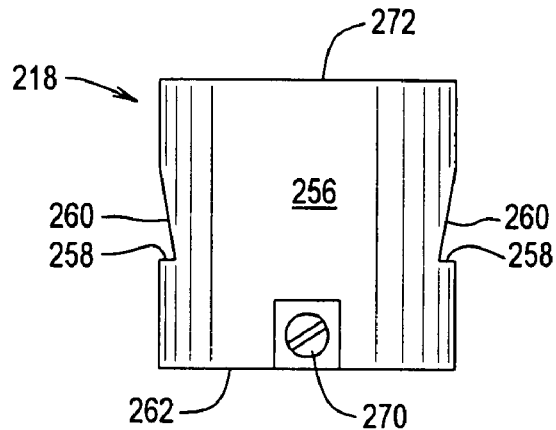
FIG. 17A is an elevational view of a cooperatingly shaped electrical component that is received in the receptacle member of the cover plate assembly of FIG. 14A.
Figure 17B:
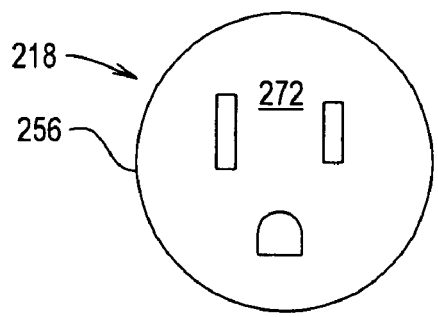
FIG. 17B is a top plan view of the electrical component of FIG. 17A.
Figure 17C:
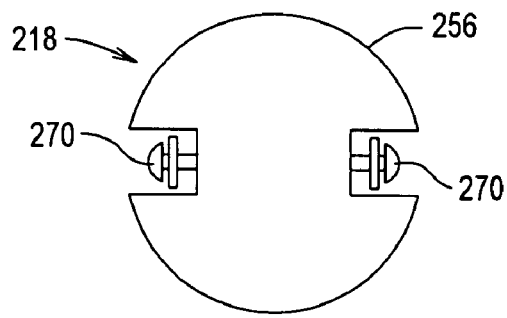
FIG. 17C is a bottom plan view of the electrical component of FIGS. 17A-B.

The outside of the receptacle member also includes a plurality of flexible, outwardly biased finger members 248, that extend upwardly and outwardly from the cylindrical exterior of the body 244. As can be seen in FIG. 14, the fingers 248 form a spring-type connection between the receptacle member and the plate member 214: As the receptacle member is pressed into the opening 240 of the plate member, the locking fingers 248 deflect resiliently in order to pass through the opening. An undercut 250 on the locking tabs eventually abuts a lip 252 at the bottoms of the alignment notches, at which point the resilient fingers 248 spring back out to a position in which their ends engage the back surface 226 of the plate member, thereby locking the receptacle member firmly in place. The receptacle member can therefore be easily and quickly installed by simply inserting it into the plate opening 240 and pressing it home; it will be understood, however, that other forms of mounting and locking mechanisms may be used.

The hollow interior 252 of the receptacle member includes additional resiliently flexible locking fingers 254, that extend outwardly and inwardly from the inner surface of the wall of the cylindrical body 244. The electrical component 218 (see FIGS. 11A-17C) is specially configured and has a cylindrical body 256 with cooperating locking notches 258 and angled recesses 260 to accommodate the locking fingers 254 when in their outwardly extended configuration. Thus, when the electrical component is pressed fully into the receptacle member the fingers 254 spring out to engage the notches 258 so as to prevent the electrical component from being withdrawn, while at the same time the end 262 of the body contacts an annular flange 264 about the bottom of the receptacle member to prevent further travel in an inward direction.

Thus, to install the electrical component, the wires are led through the back and front openings 266, 268 of the receptacle and attached to the screw contacts 270 or other connections on the electrical component. The electrical component is then placed in opening 268 and pressed inwardly until the snap connection locks it in place, with only the operative portion 272 of the component being exposed. Inasmuch as the front of the plate is covered with the layer of drywall mud 274 or other fill material, the operative surface of the electrical component is again essentially the only part that will be visible when the installation is finished.

When it is desired to remove the electrical component (e.g., for replacement or repair), the cylindrical sleeve of a removal tool (which will be described below) is inserted into the small annular gap 274 between the electrical component and the socket 216, and pressed inwardly along the sides of the component. As this is done, the leading edge of the cylindrical sleeve slides over the fingers 254 and depresses them out of engagement with the locking notches 258; a compression spring or springs may optionally be provided, between the body of the electrical component and the bottom of the receptacle, so that the component "pops" out of the receptacle as the fingers are disengaged. The electrical component can then be withdrawn from the receptacle 216, together with the cylindrical sleeve of the removal tool.

Exemplary dimensions for the embodiment shown in FIGS. 14-17C are set forth in the following Table B:

TABLE B

| | |
|---|---|
| Plate Overall Length | 208.50 mm |
| Plate Overall Width | 156.00 mm |
| Width of Stepped Border | 25.00 mm |
| Thickness of Stepped Border | 0.50 mm |
| Thickness at Outer Edge of Sloped Surface | 1.00 mm |
| Thickness at Inner Edge of Sloped Surface | 1.50 mm |
| Thickness at Inside Wall | 2.00 mm |
| Diameter of Center Opening (exclusive of lip) | 42.25 mm |
| Outside Diameter of Receptacle (exclusive of locking fingers) | 40.50 mm |
| Inside Diameter of Receptacle (exclusive of locking fingers) | 36.50 mm |
| Inside Depth of Receptacle | 33.53 mm |
| Diameter of Electrical Component | 35.00 mm |
| Depth of Electrical Component | 33.50 mm |

Again, it will be understood that any foregoing dimensions are provided by way of illustrating a preferred embodiment of the present invention, and may vary in other embodiments depending on a range of design factors.

The illustrated embodiment thus provides a highly convenient and inexpensive means for removably mounting an electrical component within a receptacle member, however, it will be understood that other forms of locking and mounting mechanisms may be used, such as a bayonet-type connection, for example. Moreover, it will be understood that, in addition to the electrical outlet that is shown, other forms of electrical components (e.g., switches, lights, cable outlets, thermostats, light fixtures and so on) may be similarly configured for interchangeable mounting in the receptacle member. Also, in some embodiments the receptacle member may be formed integrally with the plate member, rather than as a separate piece. Moreover, the assembly may be configured for installation of multiple electrical components rather than a single component as shown.

FIGS. 18-25D provide examples of some of these other mechanisms and components, as well as additional forms of plate assemblies.

FIG. 18 shows an installation 280 having a plate member 282 in which the receptacle member 284 is mounted, not by external locking fingers, but by threaded engagement between it and the opening 286, with the exterior 288 of the receptacle body being provided with threads 290 over at least a portion of its length. As can be seen, a locking ring or nut 292 engages the threaded the body behind the plate member, while at the forward end the threads terminate at the back surface 294 of an annular shoulder 296 that is formed about the opening 298 for the component 300. The annular shoulder 296 corresponds to the projecting wall portions that are forward about the openings in the plate members described above, and preferably likewise has a sloped outer surface as shown; similarly, the upper lip 302 of the shoulder corresponds to the lip of the wall portions described above.

The threaded engagement between the receptacle member 284 and the plate member 282 allows the distance between the lip 302 of the receptacle and the front surface of the plate member to be selectively adjusted, so as to be able to accommodate variations in the depth by which the outlet box is set within the wall. The adjustment is accomplished by loosening the locking ring 292 and rotating the receptacle member 284 in one direction or the other relative to the plate member, so as to move the annular shoulder 296 towards or away from the front of the plate member until the lip 302 is positioned so that it will preferably lie flush with (or just slightly proud of) the front surface 304 of the wall 306, at which point the locking ring is again tightened against the back of the plate member. The wires (not shown) are drawn through the bottom opening 316 of the receptacle and connected to the terminals of the component 300, which is then inserted through opening 302 and pressed into the receptacle member until it is locked in place by resilient fingers 318, in the manner described above. The plate member is then mounted to the flanges of the outlet box 308, using screws 310 or other suitable fasteners, with the inward end 312 of the receptacle member being received within the interior 314 of the box.

FIG. 18 additionally illustrates an embodiment in which the perimeter of the plate member 282 does not extend out over the wall but is instead set within the edges 318 of the opening, with the lip 302 or the plate member itself preferably lying substantially flush with or recessed slightly below the surface 304 of the wall. The desired front-to-back position of the plate member (i.e., approximately flush with the wall surface) can be obtained by recessing the front of the outlet box into the wall by a distance that is approximately equal to the thickness of the plate member, e.g., by measuring or using a spacer/depth gauge when installing the box. The gaps 320 between the edges of the plate member and the wall opening are then covered with wallboard tape 322, and a layer of mud 324 or other fill material is subsequently applied over the tape, the plate member and wall in the manner described above; also similar to the procedure described above, the inside edge of the fill layer is formed at the lip 302 of the wall around the component opening, while the outside edges are feathered into the wall surface 304.

In FIG. 19, in which like references numerals again refer to like elements, there is shown an installation 330 which is generally similar to that of FIG. 18, but in which the plate member 332 has a thin flange 334 formed about its perimeter that bridges the gaps 320 at the wall opening. As can be seen, the flange portion 334 is set in a plane that is somewhat forward of that of the main face 336, so that the layer 338 of mud or other fill material can be applied over the latter to a thickness adequate to provide good strength and durability around the opening for the component; the flanges 334 are relatively narrow by comparison to the breadth of the main plate face 336, so that the relatively thin layer of fill material that extends thereover is bolstered by the thicker material immediately inside and outside of the flange.

It will be understood that the plate configurations shown in FIGS. 18 and 19 may be used with other embodiments of the invention (such as those shown in FIGS. 1-14), and not only with the screw-in type receptacle members with which they are illustrated.

FIGS. 20A-20D show the configuration of the threaded receptacle member of FIGS. 18-19 in greater detail. As was noted above and as is shown in FIG. 20A, the threads 290 extend over the forward portion of the cylindrical exterior 288 of the receptacle member 284; the threads may extend any desired distance over the body of the receptacle, however it is anticipated that a range of travel of about ¼-¾ inch, allowing for the locking ring/nut, will suffice for the majority of installations. The annular shoulder 296 is formed at the forward (front) end of the cylindrical body, with the threads 290 preferably extending all the way thereto, so that the back surface 294 of the shoulder can be tightened directly against the front surface of the plate member if desired. The threads may optionally be interrupted by longitudinal channels or cutouts 340, to accommodate the tabs of a locking washer (not shown) that is slipped over the threads, or other alignment or locking features, if desired.

Figure 20A:
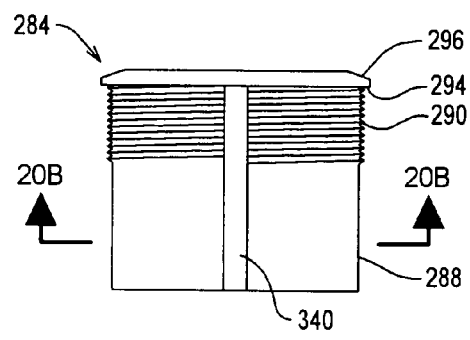
FIG. 20A is an elevational view of the threaded receptacle member of the installations of FIGS. 18 and 19, showing the configuration thereof in greater detail.
Figure 20B:
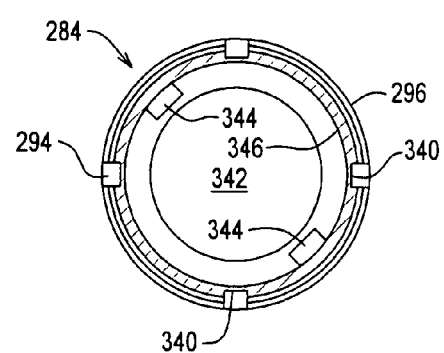
FIG. 20B is a cross-sectional view of the threaded receptacle member of FIG. 20A, taken along line 20B in FIG. 20A.
Figure 20C:
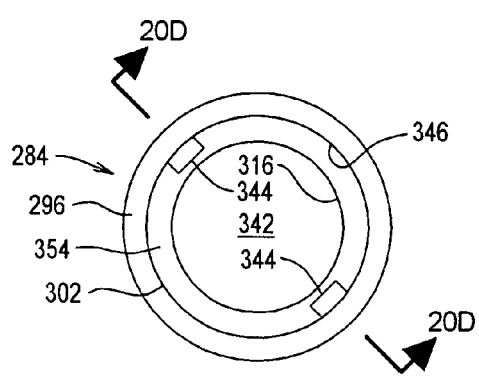
FIG. 20C is a plan view of the receptacle member of FIGS. 20A-20B.
Figure 20D:
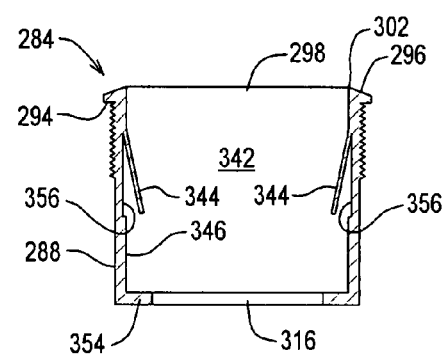
FIG. 20D is a cross-sectional view of the receptacle member of FIGS. 20A-20C, taken along line 20D in FIG. 20C.

As can be seen in FIGS. 20B-D, in turn, the receptacle member 284 has a hollow interior 342 for receiving the electrical component, in a manner similar to that described above, and likewise includes resilient locking fingers 344 that likewise extend downwardly and inwardly from the inner surface 346 of the receptacle to engage cooperating notches on the electrical component that is installed therein.

Figure 21A:
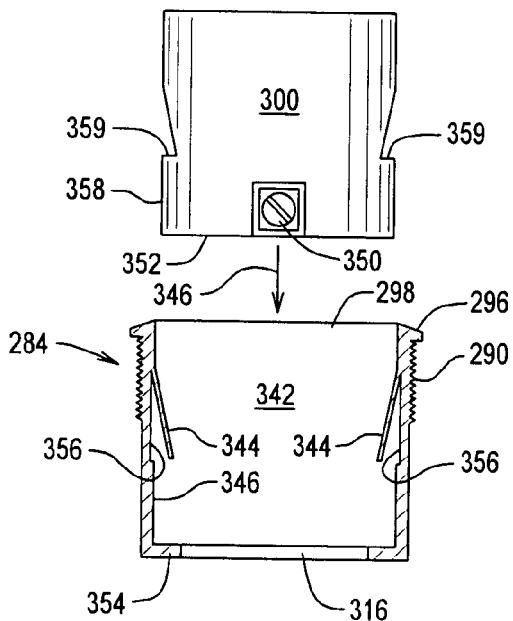
FIGS. 21A-21B are cross-sectional views showing the steps of installing an electrical component within the receptacle member of FIGS. 20A-20D.
Figure 21B:
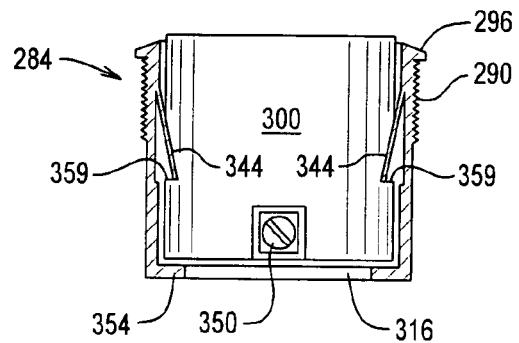

FIGS. 21A-B show the sequential steps of installing the electrical component 300 in the receptacle member 284, while FIGS. 22A-D show the steps involved in removing the component from the receptacle member. These are generally similar to the steps for installation/removal using the electrical component and receptacle described above, but with the use of the removal tool being shown and explained in more detail.

As can be seen in FIG. 21A, the electrical component 300 is inserted into the interior 342 of the receptacle member 284 in the direction indicated by arrow 346, via opening 298, the wires (not shown) having previously been pulled through the bottom opening 316 of the receptacle and attached to the contacts 350 of the component. The component is pressed home until its bottom end 352 contacts the flange 354 about the bottom opening 316, thus arresting movement into the receptacle member. At this point, the resilient locking fingers 344, having been deflected into recesses 356 in wall 346 in order to allow the lower end portion 358 of the component to pass thereover, snap back out and engage the cooperating locking notches 359 so as to hold the component against being withdrawn. The component is thus locked firmly in the receptacle member, as shown in FIG. 21B.

FIGS. 22A-D, in turn, show the steps in removing the component from the receptacle member, using a removal tool 360.

Figure 22A:
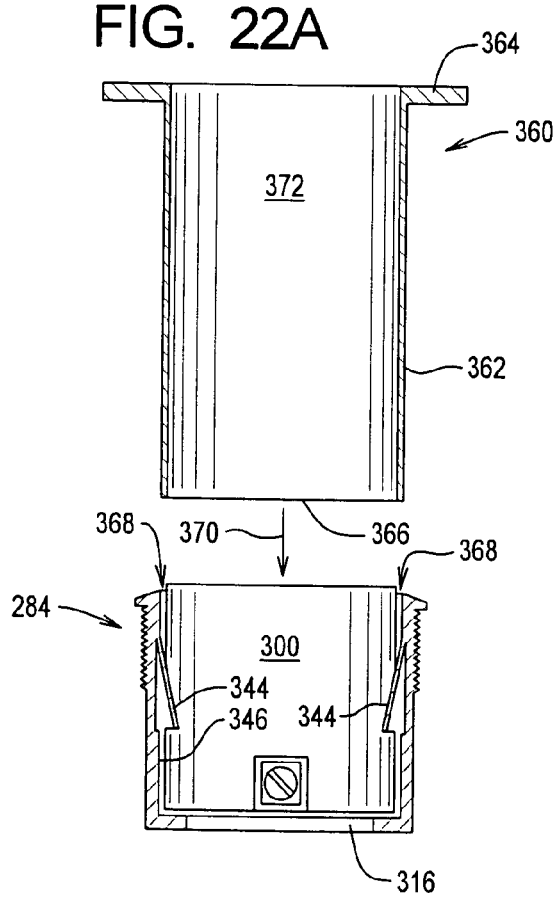
FIGS. 22A-22D are cross-sectional views showing the steps in removing an electrical component from the receptacle member of FIGS. 20A-20D.

As can be seen in FIG. 22A, the main body of the removal tool is formed by a cylindrical, thin-walled sleeve 362, with a flange 364 being mounted at one end of the sleeve to provide a finger grip for the user.

To remove the electrical component 300 from the socket 284, the thin, circular working edge 366 of the tool is inserted into the narrow annular gap 368 between the inner wall 346 of the receptacle and the electrical component 300, in the direction indicated by arrow 370. As this is done, the generally cylindrical body of the electrical component enters and is received within the cooperating hollow interior 372 of the removal tool.

Figure 22B:
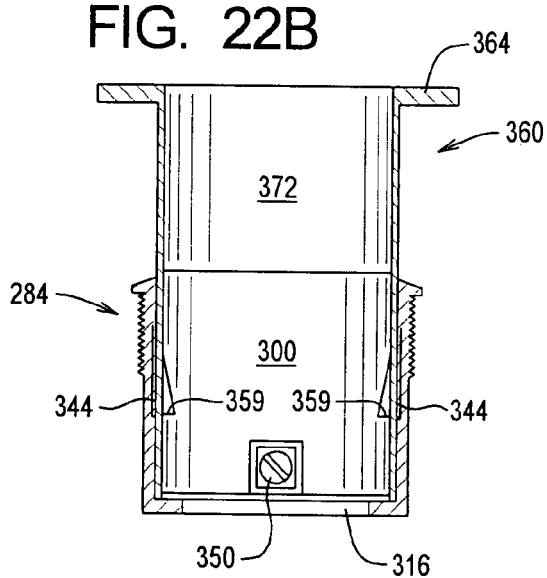
Figure 22C:
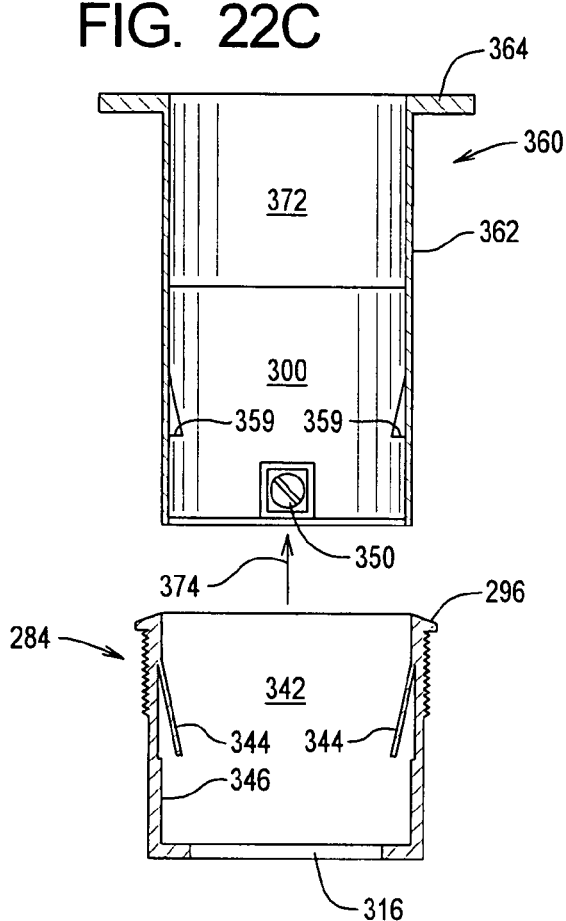
Figure 22D:
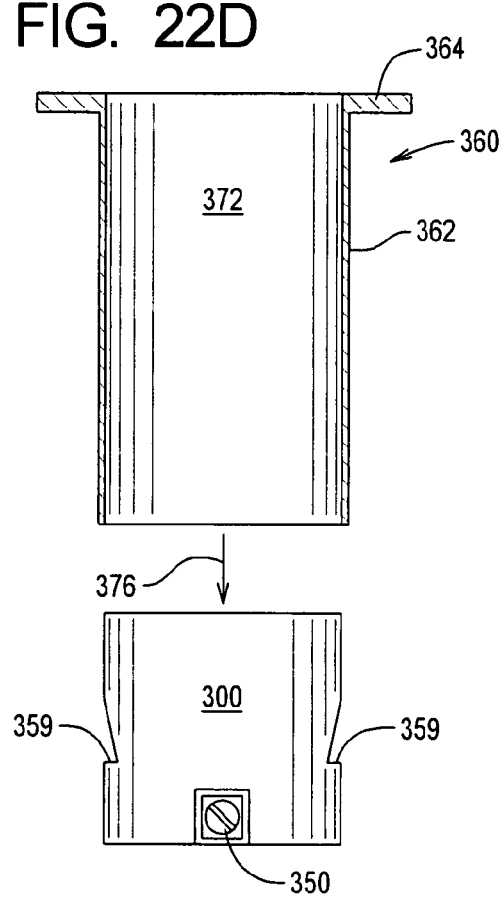

As the edge 366 at the end of the removal tool passes over the resilient locking fingers 344, the fingers are deflected outwardly and into recesses 356, disengaging them from the locking notches 360 in the electrical component as shown in FIG. 22B. The tool is then withdrawn from the receptacle, together with the electrical component that is carried in the interior 372 of the sleeve, in the direction indicated by arrow 374 in FIG. 22C, with the exterior of the sleeve keeping the locking fingers pressed into their recesses as this is done. The electrical component is then removed from within the tool itself, in the direction indicated by arrow 376 in FIG. 22D, by pulling on the attached wires (not shown) or by pressing with a screwdriver or other elongate implement inserted through the opening 278 at the opposite end of the sleeve.

Removal of the electrical component can therefore be accomplished very quickly and conveniently, without in any way disturbing the finish of the wall.

Figure 23A:
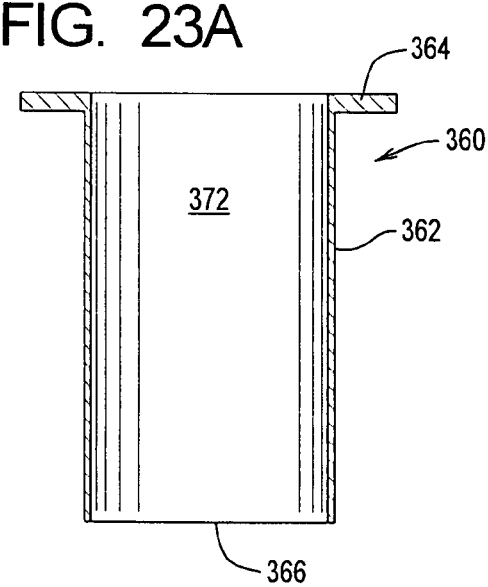
FIGS. 23A-23B are cross-sectional and plan views of the removal tool used in the steps shown in FIGS. 22A-22D.
Figure 23B:
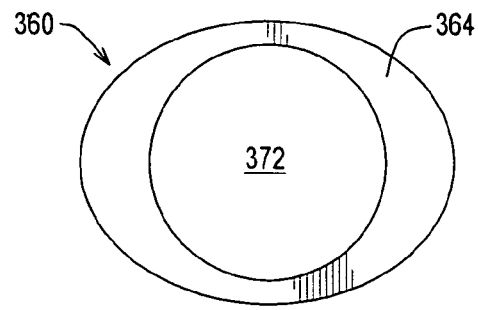

FIGS. 23A-B show the removal tool in greater detail. The finger-grip flange 364 has an oval shape in the embodiment that is illustrated, however, it will be understood that any suitable shape may be used. Moreover, the interior 372 of the sleeve 362 may be sized to form a slight interference fit with the body of the electrical component, or may be provided with a rubberized or similar surface for forming a frictional engagement with the body of the component, to establish a grip that aids in withdrawing the electrical component from the receptacle member.

As noted above, the components that are installable in the receptacle members may be of many different types, two of which are illustrated in FIGS. 24A-D and FIGS. 25A-D.

In particular, FIGS. 24A-D show a dimmer switch 380 having a generally cylindrical body 382 that is mountable in a receptacle member in the manner described above. The upper (front) end of the dimmer switch is provided with a rotatable knob 384 that, in this example, can be configured to pop out from the wall when pressed, so that it can be rotated to adjust the lights, after which the knob is pressed back into a recessed position with its outer surface lies flush with the surrounding wall.

Figure 24A:
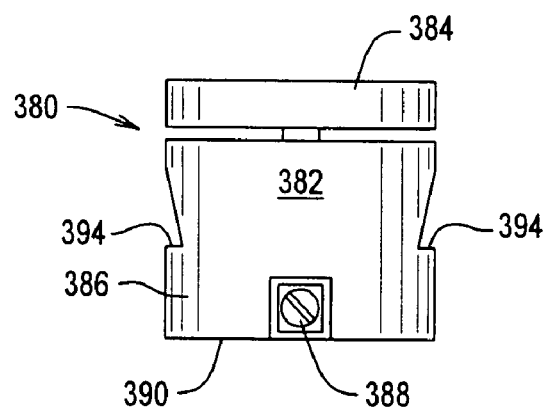
FIG. 24A is an elevational view of a first electrical component that is mountable in the receptacle member of FIGS. 20A-20D, in the form of a dimmer switch having a rotatable knob at its outer end.
Figure 24B:
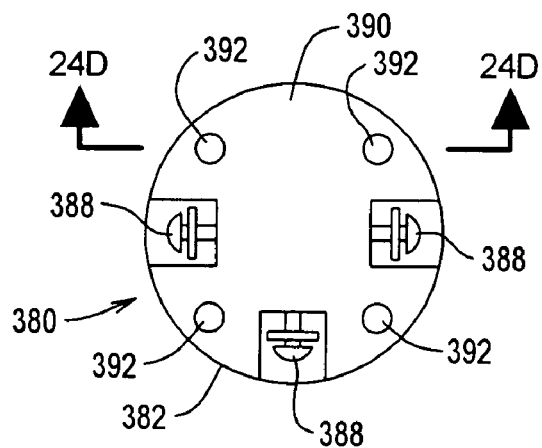
FIG. 24B is a bottom plan view of the dimmer switch of FIG. 24A.
Figure 24C:
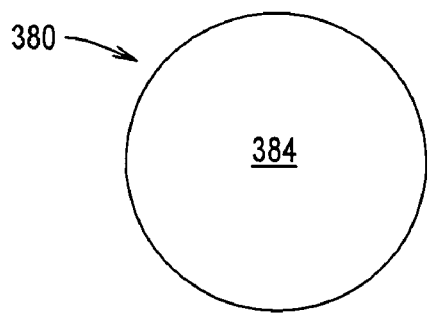
FIG. 24C is a top plan view of the dimmer switch of FIGS. 24A-24B.
Figure 24D:
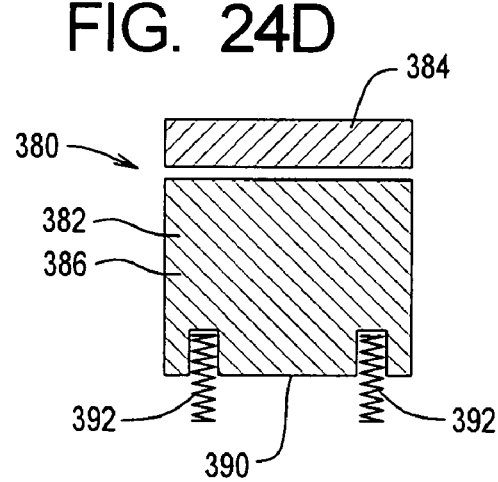
FIG. 24D is a cross-sectional view of the dimmer switch of FIGS. 24A-24C, taken along line 24D in FIG. 24B.
Figure 25A:
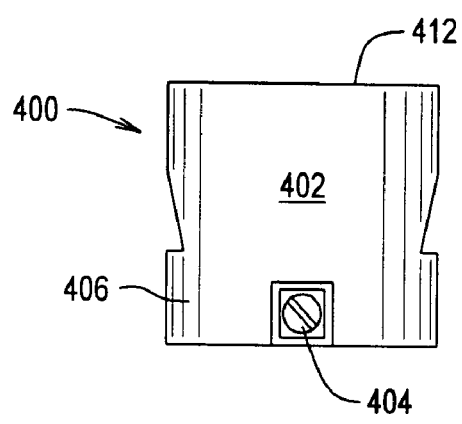
FIG. 25A is an elevational view of a second electrical component that is mountable in the receptacle member of FIGS. 20A-20D interchangeably with the electrical component of FIGS. 24A-24D, in the form of a grounded electrical outlet.
Figure 25B:
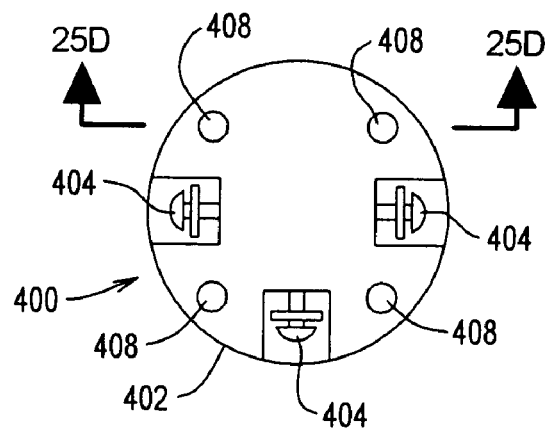
FIG. 25B is a bottom plan view of the grounded electrical outlet of FIG. 25A.
Figure 25C:
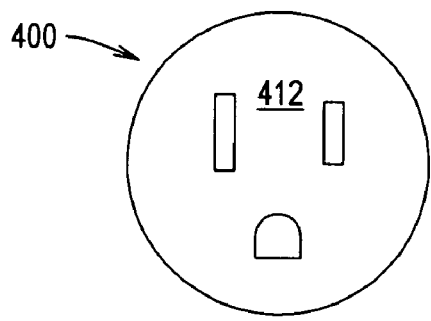
FIG. 25C is a top plan view of the grounded electrical outlet of FIGS. 25A-25B.
Figure 25D:
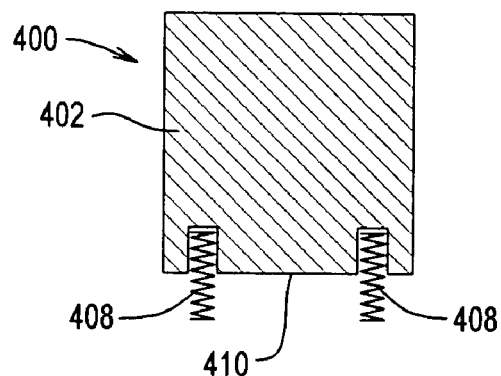
FIG. 25D is a cross-sectional view of the grounded electrical outlet of FIGS. 25A-25C, taken along line 25D in FIG. 25B.

The lower portion 386 of the switch, in turn, includes screw contacts 388 (or similar connections) that extend towards the sides, leaving the bottom end 390 of the switch body clear to contact the bottom wall of the receptacle member in the manner described above. Coil springs 392 are in turn mounted within recesses in the bottom surface 390 of the component, so that their lower ends extend downwardly therefrom when in an uncompressed configuration, as shown in FIG. 24D. As can be seen in FIG. 24B, the springs 392 are located near the circular perimeter of the bottom surface 390, so that they will contact the annular surface 354 at the bottom of the receptacle member and therefore be compressed as the component is inserted into the receptacle. The compressed springs stabilize the component and prevent it from "jiggling" within the receptacle during use. Then, when the removal tool is inserted to disengage the locking fingers from notches 394, in the manner described above, the springs "pop" the component up from the bottom of the receptacle and into the interior of the tool, thus facilitating removal.

FIGS. 25A-25D show another example of electrical component that can be mounted within the receptacle members, interchangeably with the dimmer switch and other similarly configured components, in this case a grounded electrical outlet 400. The outlet similarly includes a generally cylindrical body 402, electrical connections 404, a lower portion 406, and springs 408 set within and protruding from its lower end 410. The difference between the two components lies only in their operative portions, the outlet 400 having a flush, stationary outlet surface 412 with plug openings, in place of the rotatable knob of the dimmer switch.

As noted above, numerous other components may be similarly configured for interchangeable mounting in the receptacle members, including volume controls, cable jacks, telephone jacks, speaker outlets, pendant light connections, lights and light fixtures, to give just a few examples.

Although the assemblies described above have the electrical component located centrally, this is not a necessity, and the "plug-in" embodiment described in the preceding section in particular provides an ability to locate single or multiple electrical components at various, offset positions within the plate assembly, and therefore also in the finished installation. Moreover, by changing the orientation of the plate assembly or assemblies, a large number of variations in positioning can be achieved using only a few different configurations of plates.

Figure 26A:
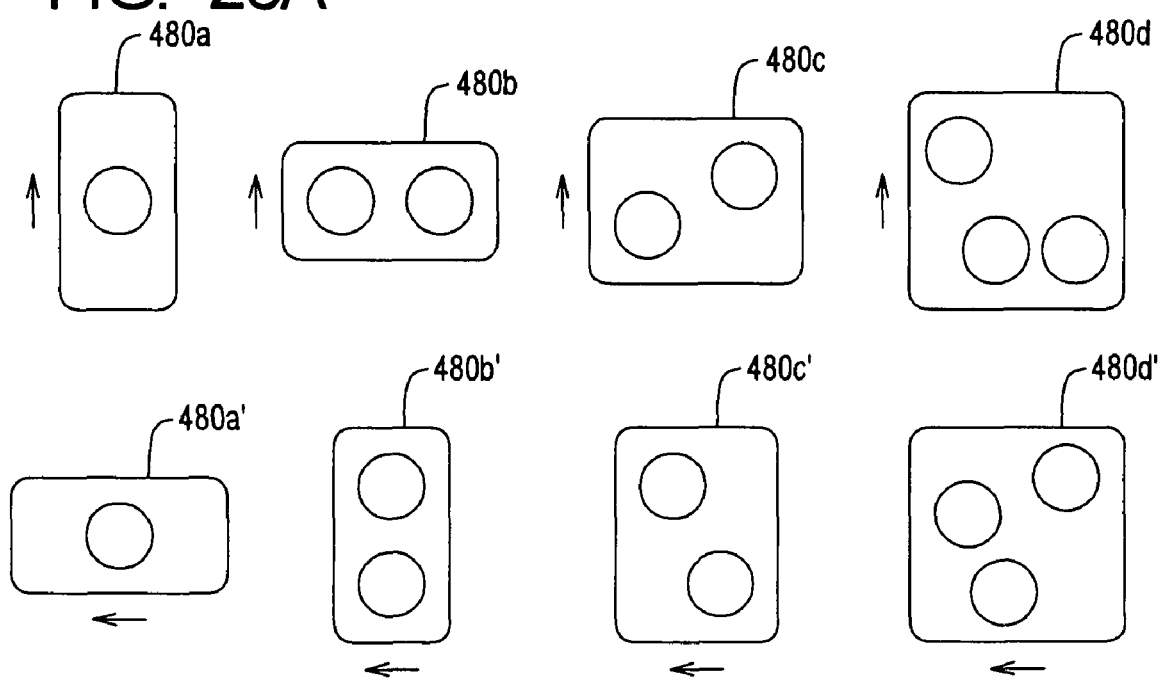
FIG. 26A is a plan view of multiple plate assemblies, similar to the plate assembly that is shown in FIG. 14 but having one or multiple receptacles at offset locations, showing the manner in which the plate assemblies can be oriented in different directions to create varying appearances.

For example, FIG. 26A shows four cover plate assemblies 480a-d having receptacles for components positioned at differing, offset (as opposed to central) locations. The top row shows the assemblies in a first orientation, while the lower row shows the plates rotated at 90°, with the initial orientation being indicated by the associated arrows. A comparison of the top row of images 480a-d with the lower row of images 480a'-d' shows the very different appearance that can be presented by the same plate assembly, when simply turned from one orientation to another.

Figure 26B:
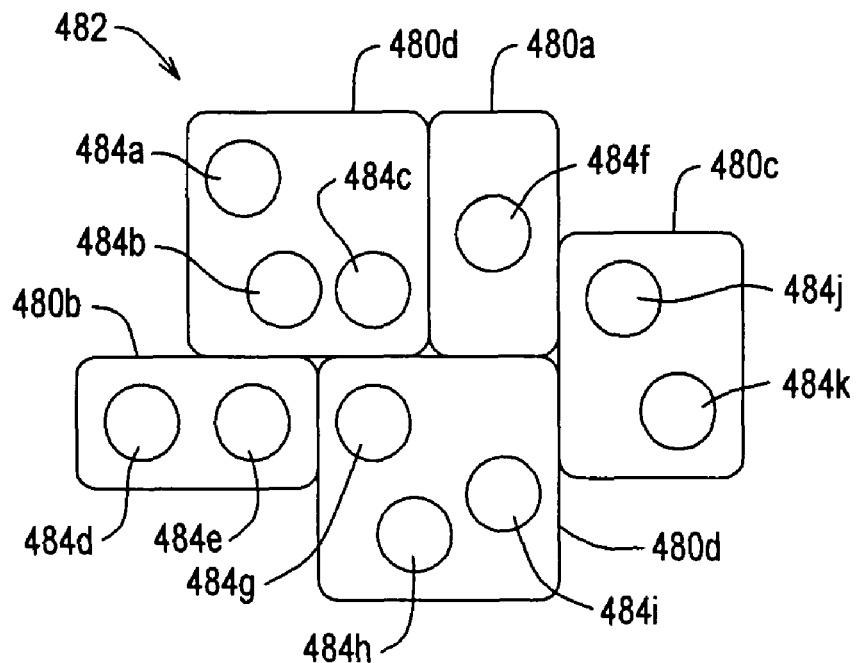
FIG. 26B is an elevational view of a plurality of the plate assemblies of FIG. 26A, mounted together so that the operative portions of the electrical components are displayed in an apparently random pattern.
Figure 26C:
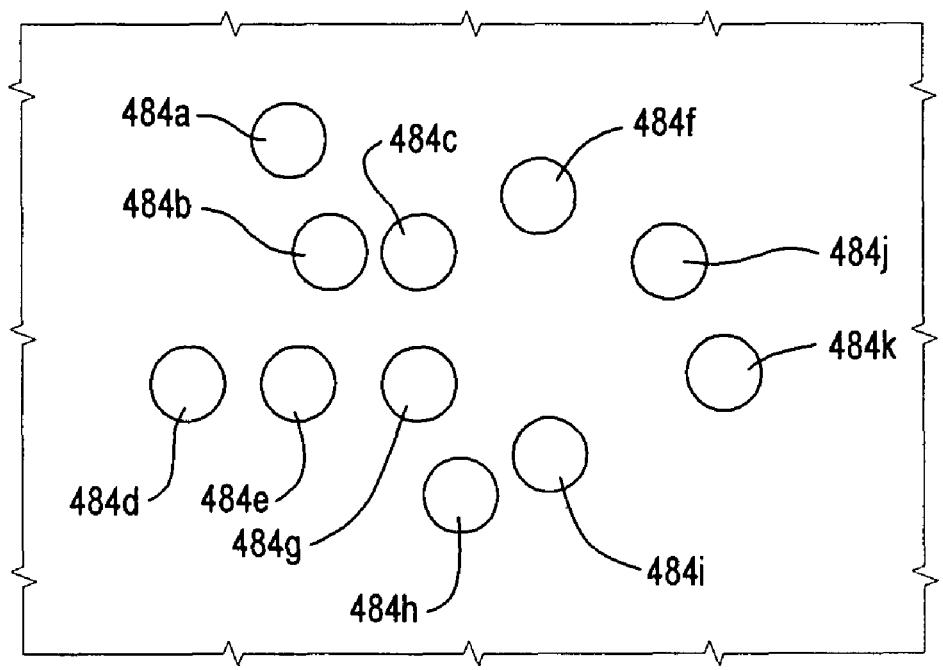
FIG. 26C is an elevational view of the finished installation using the plate assemblies of FIG. 26B, showing the pattern in which the operative portions of the components appear at the surface of the wall.

The assemblies having offset receptacles may be used individually to form installations that are more visually interesting than when using centered components. Furthermore, as is shown in FIG. 26B, several of the assemblies can be mounted together to construct a visually striking grouping 482. As can be seen, the grouping is formed using plate members having only the four configurations 480a-d that are shown in FIG. 26A. Nevertheless, when the installations are finished, the operative surfaces 484a-k appear to be distributed in a virtually random manner, creating visual interest and avoiding a rigid or structured appearance. The visual interest can be heightened by using different colors for the exposed surfaces, which can also be used to distinguish between the components and/or their functions (e.g., different colors can be used to distinguish between different switches or other controls). Moreover, the components may be lighted so that an illuminated pattern appears on the wall when the room is darkened. It will also be understood that the plate assemblies with offset component can be used to create structured patterns, designs or images, and not just random-appearing patterns as described above.

Figure 27:
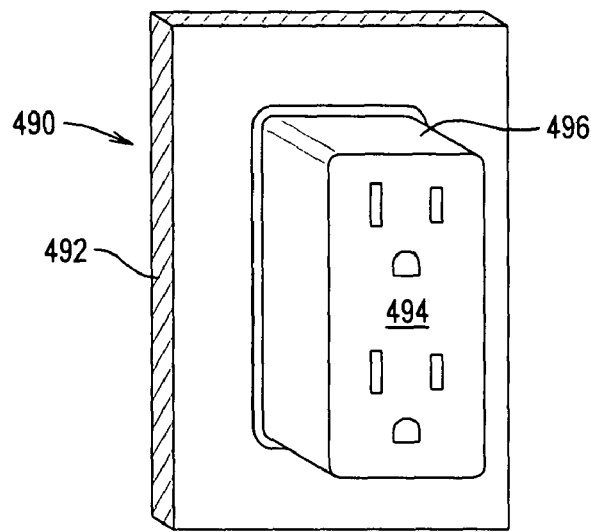
FIG. 27 is a perspective view of an outlet box assembly in accordance with another embodiment of the present invention, in which the operative surface of the outlet or other electrical component protrudes by a distance that is approximately equal to a predetermined thickness of a wall material covering material, such as panelling or stone, for example.
Figure 28:
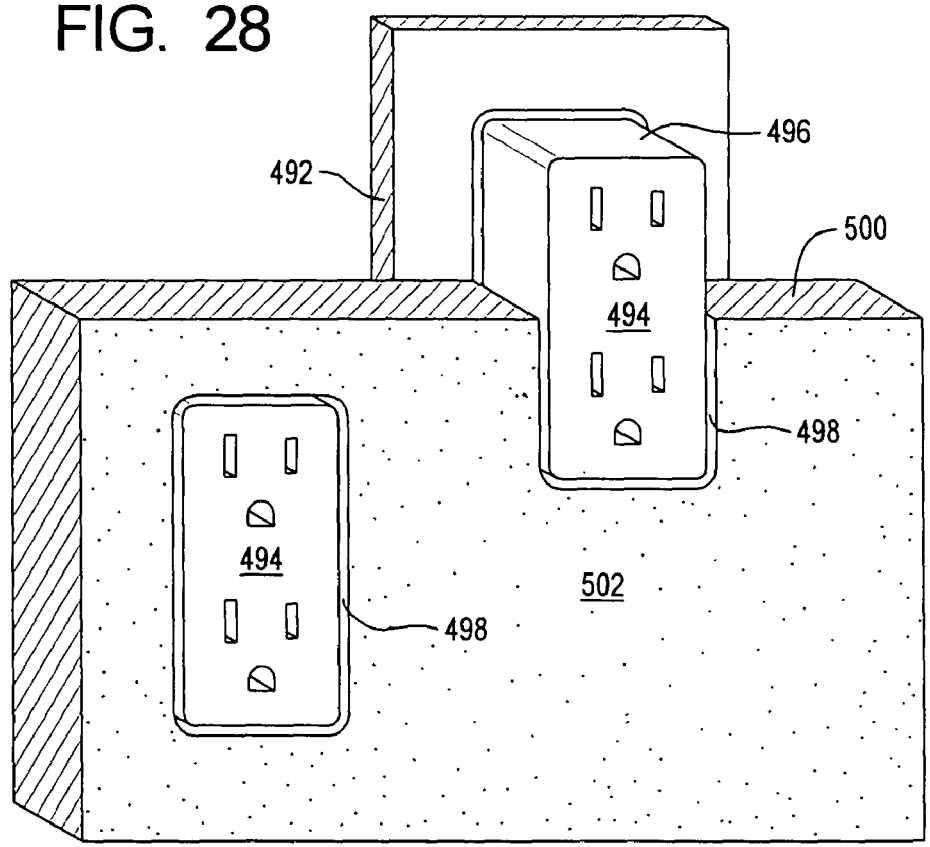
FIG. 28 is a perspective view, partly in cutaway, showing the manner in which the junction box assembly of FIG. 27 is installed and the layer of wall material is placed thereover so that the protruding operative face of the electrical component is positioned substantially flush with the front surface of the wall covering material.

FIGS. 27-28 illustrate another embodiment of the invention, in which there is an assembly 490 having a plate member 492, from which the operative surface 494 of the electrical component 496 projects by a distance approximately equal to the thickness of a surfacing material that is installed over both the wall and the plate member, such as a layer of panelling, stone tile or stucco, for example. To form the installation, a cutout 498 is made in the panelling, stone or other material that forms the overlay 500, so that when the overlay is installed the operative surface 494 of the electrical component lies proximately flush with the surface 502 of the former. If desired, the gap between the opening 498 and electrical component 496 can be filled with putty, caulk or other material.

It will be observed that in all of the embodiments described above, the operative portion of the electrical component (or its surround in the case of components with projecting operative portions) lies generally at or flush with the finished surface of the wall, and that the underlying outlet box and associated plate member are covered by the same finishing material as the wall, so that the operative portion of the component is virtually the only part that can be seen and visually distinguished from the surrounding wall when the installation is completed.

It is to be recognized that various alterations, modifications, and/or additions may be introduced into the constructions and arrangements of parts described above without departing from the spirit or ambit of the present invention.

What is claimed is:

1. A method for forming an electrical outlet box installation, comprising the steps of:
    providing an electrical component that is mounted to an outlet box in a wall such that an operative portion of said electrical component projects through an opening in said wall to a surface thereof;
    mounting a plate assembly over said outlet box, so that an inner edge of said plate assembly closely surrounds said operative portion of said electrical component and a perimeter portion of said plate assembly extends outwardly therefrom; and
    applying a layer of wall fill material over said plate assembly so as to form a flush, substantially uniform surface that extends over and around said plate assembly and outwardly from said perimeter portion thereof and blending said layer into a surrounding area of said surface of said wall, so that when finished said layer of fill material appears substantially level and continuous with said surface of said wall and substantially only said operative portion of said electrical component is visibly distinguishable at said surface of said wall.

2. The method of claim 1, wherein the step of mounting a plate assembly over said electrical component and opening comprises:
    mounting said plate member over said electrical component and opening so that a forwardly projecting wall portion of said plate member closely surrounds said operative portion of said electrical component.

3. The method of claim 2, wherein the step of applying a layer of fill material over said plate assembly comprises:
    applying said layer of fill material over an outer surface of said plate assembly up to said projecting wall portion that closely surrounds said operative portion of said electrical component.

4. The method of claim 1, wherein the step of applying said layer of fill material over said plate assembly comprises:
    applying said layer of fill material over a surface of said plate assembly that tapers outwardly from said opening towards said perimeter portion of said plate assembly.

5. The method of claim 1, wherein the step of mounting said plate assembly over said electrical component and opening comprises:
    mounting said perimeter portion of said plate assembly over said surface of said wall surrounding said opening.

6. The method of claim 5, wherein the step of mounting said perimeter portion of said plate assembly over said surface of said wall comprises:
    applying a layer of adhesive material over said perimeter portion of said plate assembly so that said layer of adhesive material overlaps from there onto said surface of said wall.

7. The method of claim 6, wherein the step of applying a layer of adhesive material over said perimeter of said plate assembly comprises:
    applying a layer of adhesive tape material over said perimeter portion of said plate assembly.

8. The method of claim 6, wherein the step of applying said layer of fill material comprises:
    applying said layer of fill material over both said front surface of said plate assembly and said layer of adhesive material on said perimeter portion of said plate assembly.

9. The method of claim 5, wherein the step of mounting said plate assembly over said surface of said wall comprises:
    driving at least one fastener through said perimeter portion of said plate assembly and into said wall.

10. The method of claim 9, wherein the step of applying said layer of fill material comprises:
    applying said layer of fill material over a head portion of said at least one fastener in said perimeter portion of said plate assembly.

11. The method of claim 1, wherein the step of mounting said plate assembly over said electrical component comprises:
    mounting a first, fixed plate member to said wall surface so that an opening in said fixed plate member forms an annular gap around said operative portion of said electrical component; and
    detachably mounting a second, removable plate portion in said annular gap around said operative portion of said electrical component, so that said removable plate member can be selectively removed to provide access to said electrical component without damaging said wall surface around said component.

12. The method of claim 11, wherein the step of applying said layer of fill material over said plate assembly comprises:
    applying said layer of fill material over both said fixed and removable plate members of said assembly.

13. The method of claim 1, wherein the step of applying said layer of fill material over said plate assembly comprises the steps of:
    placing a removable cover over said operative portion of said electrical component;
    applying said fill material as a substantially continuous layer over said plate assembly and said removable cover; and
    removing said removable cover so as to expose said operative portion of said electrical component.

14. An electrical component installation, comprising:
    a wall having an opening formed therein;
    an electrical component that is mounted to an outlet box in said wall so that an operative portion of said electrical component projects through said opening to a front surface of said wall;
    a plate assembly that is mounted over said outlet box and said opening in said wall, said plate assembly having an opening that fits closely around said operative portion of said electrical component; and
    a layer of wall fill material that is formed over said plate assembly and about said operative portion of said electrical component so as to form a flush, substantially uniform surface that extends over and around said plate assembly and outwardly from said perimeter portion thereof and that blends into a surrounding area of said surface of said wall, so that said layer of fill material appears substantially level and continuous with said surface of said wall and essentially only said operative portion of said electrical component is visibly distinguishable at said surface of said wall.

15. A method for forming an electrical outlet box installation, comprising the steps of:
    providing an electrical component that is mounted to an outlet box in a wall such that an operative portion of said electrical component projects through an opening in said wall to a surface thereof;

mounting a plate assembly over said outlet box, so that an inner edge of said plate assembly closely surrounds said operative portion of said electrical component and a perimeter portion of said plate assembly extends outwardly therefrom;

the step of mounting said plate assembly over said electrical components and opening comprising:

mounting said perimeter portion of said plate assembly over said surface of said wall surrounding said opening;

the step of mounting said perimeter portion of said plate assembly over said surface of said wall comprising:

applying a layer of adhesive material over said perimeter portion of said plate assembly so that said layer of adhesive material overlaps from there onto said surface of said wall; and applying a layer of wall finishing material over said plate assembly and blending said layer into a surrounding area of said surface of said wall, so that when finished substantially only said operative portion of said electrical component is visibly distinguishable at said surface of said wall.

16. The method of claim 15, wherein the step of applying a layer of adhesive material over said perimeter of said plate assembly comprises:

applying a layer of adhesive tape material over said perimeter portion of said plate assembly.

17. The method of claim 15, wherein the step of applying said layer of fill material comprises:

applying said layer of fill material over both said front surface of said plate assembly and said layer of adhesive material on said perimeter portion of said plate assembly.

18. The method of claim 15, wherein the step of mounting said plate assembly over said electrical component comprises:

mounting a first, fixed plate member to said wall surface so that an opening in said fixed plate member forms an annular gap around said operative portion of said electrical component; and detachably mounting a second, removable plate portion in said annular gap around said operative portion of said electrical component, so that said removable plate member can be selectively removed to provide access to said electrical component without damaging said wall surface around said component.

19. The method of claim 18, wherein the step of applying said layer of fill material over said plate assembly comprises:

applying said layer of fill material over both said fixed and removable plate members of said assembly.

* * * * *